(12) United States Patent
Isebrand et al.

(10) Patent No.: US 11,662,235 B2
(45) Date of Patent: May 30, 2023

(54) AIR DATA PROBE WITH ENHANCED CONDUCTION INTEGRATED HEATER BORE AND FEATURES

(71) Applicant: Rosemount Aerospace Inc., Burnsville, MN (US)

(72) Inventors: Scott D. Isebrand, Minneapolis, MN (US); Greg Allen Seidel, Farmington, MN (US); Scott Wigen, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/492,325

(22) Filed: Oct. 1, 2021

(65) Prior Publication Data

US 2023/0107330 A1 Apr. 6, 2023

(51) Int. Cl.
| | |
|---|---|
| *G01F 1/05* | (2006.01) |
| *G01F 1/46* | (2006.01) |
| *G01F 1/688* | (2006.01) |
| *G01F 1/42* | (2006.01) |

(52) U.S. Cl.
CPC ............... *G01F 1/46* (2013.01); *G01F 1/42* (2013.01); *G01F 1/688* (2013.01)

(58) Field of Classification Search
CPC .............. G01F 1/46; G01F 1/42; G01F 1/688
See application file for complete search history.

(56) References Cited

U.S. PATENT DOCUMENTS

| | | | |
|---|---|---|---|
| 2,254,155 | A | 8/1941 | Reichel |
| 2,343,282 | A | 3/1944 | Daiber |
| 2,381,327 | A | 8/1945 | Woodman et al. |
| 2,393,593 | A | 1/1946 | Daiber |
| 2,397,084 | A | 3/1946 | Bernhardt |
| 2,399,370 | A | 4/1946 | Mcorlly |
| 2,428,542 | A | 10/1947 | Bernhardt |
| 2,601,331 | A | 6/1952 | Segal |

(Continued)

FOREIGN PATENT DOCUMENTS

| | | |
|---|---|---|
| CN | 2420633 Y | 2/2001 |
| CN | 102735888 A | 10/2012 |

(Continued)

OTHER PUBLICATIONS

Bifilar Coil, Wikipedia, as captured by the Internet Archive on Aug. 2, 2015, 3 pages.

(Continued)

*Primary Examiner* — Freddie Kirkland, III
(74) *Attorney, Agent, or Firm* — Kinney & Lange, P.A.

(57) ABSTRACT

A probe head of an air data probe includes a body extending from a first end to a second end of the probe head and a rod heater. The body includes an inlet adjacent the first end of the probe head, an air passageway extending through the body from the inlet to a second end of the probe head, a water dam extending radially through the body such that the air passageway is redirected around the water dam, a heater bore extending within the body, and an enhanced conduction area between heater bore and an exterior surface of the probe head. The inlet, the air passageway, the water dam, and the heater bore are all unitary to the body. The rod heater is positioned within the heater bore.

20 Claims, 22 Drawing Sheets

(56) References Cited

U.S. PATENT DOCUMENTS

| | | |
|---|---|---|
| 2,640,347 A | 6/1953 | Majeski |
| 2,984,107 A | 5/1961 | Strieby et al. |
| 2,987,565 A | 6/1961 | Barnhart et al. |
| 3,138,025 A | 6/1964 | Fingerson |
| 3,267,992 A | 8/1966 | Werner et al. |
| 3,400,583 A | 9/1968 | Newport et al. |
| 3,535,930 A | 10/1970 | Patrick |
| 3,590,460 A | 7/1971 | Highducheck et al. |
| 3,885,613 A | 5/1975 | Evans |
| 4,152,938 A | 5/1979 | Danninger |
| 4,312,120 A | 1/1982 | Comer |
| 4,357,526 A | 11/1982 | Yamamoto et al. |
| 4,615,213 A | 10/1986 | Hagen |
| 4,836,019 A | 6/1989 | Hagen et al. |
| 5,025,661 A | 6/1991 | Mccormack |
| 5,046,360 A | 9/1991 | Hedberg |
| 5,062,869 A | 11/1991 | Hagen |
| 5,099,686 A | 3/1992 | Heinz-Gerhard |
| 5,127,265 A | 7/1992 | Williamson et al. |
| 5,130,707 A | 7/1992 | Hagen |
| 5,220,319 A | 6/1993 | Kendel |
| 5,228,563 A | 7/1993 | Stringham |
| 5,232,086 A | 8/1993 | Montanari |
| 5,392,622 A | 2/1995 | O'Donnell |
| 5,423,209 A | 6/1995 | Nakaya et al. |
| 5,458,008 A | 10/1995 | Rassatt |
| 5,460,022 A | 10/1995 | Parsons |
| 5,466,067 A | 11/1995 | Hagen et al. |
| 5,487,291 A | 1/1996 | Voigt |
| 5,495,942 A | 3/1996 | Izhak |
| 5,543,183 A | 8/1996 | Streckert et al. |
| 5,601,254 A * | 2/1997 | Ortiz .................. G01P 5/165 73/180 |
| 5,621,936 A | 4/1997 | Penaligon et al. |
| 5,628,565 A | 5/1997 | Hagen et al. |
| 5,639,964 A | 6/1997 | Djorup |
| 5,653,538 A | 8/1997 | Phillips |
| 5,731,507 A | 3/1998 | Hagen et al. |
| 5,740,857 A | 4/1998 | Thompson et al. |
| 5,750,958 A | 5/1998 | Okuda et al. |
| 6,049,065 A | 4/2000 | Konishi |
| 6,062,869 A | 5/2000 | Mizobuchi et al. |
| 6,070,475 A | 6/2000 | Muehlhauser et al. |
| 6,079,845 A | 6/2000 | Kreider |
| 6,236,027 B1 | 5/2001 | Miyata et al. |
| 6,237,756 B1 | 5/2001 | Caudle |
| 6,323,420 B1 | 11/2001 | Head |
| 6,371,286 B1 | 4/2002 | Montanari |
| 6,419,186 B1 | 7/2002 | Bachinski et al. |
| D463,989 S | 10/2002 | Bachinski et al. |
| 6,517,240 B1 | 2/2003 | Herb et al. |
| 6,550,344 B2 | 4/2003 | Bachinski et al. |
| 6,591,696 B2 | 7/2003 | Bachinski |
| 6,612,166 B2 | 9/2003 | Golly et al. |
| 6,648,939 B2 | 11/2003 | Neuschwander et al. |
| 6,740,857 B1 | 5/2004 | Furlong et al. |
| 6,813,942 B1 | 11/2004 | Vozhdaev et al. |
| 6,840,672 B2 | 1/2005 | Ice et al. |
| 6,892,584 B2 | 5/2005 | Gilkison et al. |
| 6,941,805 B2 | 9/2005 | Seidel et al. |
| 7,370,526 B1 | 5/2008 | Ice |
| 7,483,223 B2 | 1/2009 | Egle et al. |
| 7,549,331 B1 | 6/2009 | Powell |
| 7,597,018 B2 | 10/2009 | Braun et al. |
| 7,705,275 B2 | 4/2010 | Umotoy et al. |
| 7,716,980 B1 | 5/2010 | Colten et al. |
| 7,915,567 B2 | 3/2011 | Lhuillier |
| 7,937,977 B2 | 5/2011 | Booker |
| 8,060,334 B1 | 11/2011 | Jarvinen |
| 8,225,696 B2 | 7/2012 | Downes |
| 8,242,416 B2 | 8/2012 | Lin et al. |
| 8,341,989 B1 | 1/2013 | Hamblin et al. |
| 8,365,591 B2 | 2/2013 | Golly |
| 8,485,007 B2 | 7/2013 | Downes |
| 8,718,955 B2 | 5/2014 | Golly et al. |
| 8,857,255 B2 | 10/2014 | Anderson et al. |
| 9,080,903 B2 | 7/2015 | Ashton |
| 9,097,734 B2 | 8/2015 | Seaton et al. |
| 9,207,253 B2 | 12/2015 | Seidel et al. |
| 9,279,684 B2 | 3/2016 | Marty et al. |
| 9,366,555 B2 | 6/2016 | Schober et al. |
| 9,541,429 B2 | 1/2017 | Farokhi et al. |
| 9,664,542 B2 | 5/2017 | Gordon et al. |
| 9,719,820 B1 | 8/2017 | Jacob et al. |
| 9,722,345 B2 | 8/2017 | Arnesson et al. |
| 9,772,345 B2 | 9/2017 | Golly et al. |
| 9,791,304 B2 | 10/2017 | Wong et al. |
| 9,856,027 B2 | 1/2018 | Anderson et al. |
| 9,891,083 B2 | 2/2018 | Gordon et al. |
| 9,918,524 B2 | 3/2018 | Byrd et al. |
| 9,976,882 B2 | 5/2018 | Seidel et al. |
| 10,024,877 B2 | 7/2018 | Golly et al. |
| 10,040,570 B2 | 8/2018 | Heuer et al. |
| 10,126,320 B2 * | 11/2018 | Anderson ............... G01P 5/165 |
| 10,132,824 B2 * | 11/2018 | Benning ................ B64D 15/20 |
| 10,197,588 B2 | 2/2019 | Wong et al. |
| 10,227,139 B2 | 3/2019 | Golly et al. |
| 10,234,475 B2 | 3/2019 | Sarno et al. |
| 10,281,303 B2 | 5/2019 | Johnson et al. |
| 10,384,787 B2 | 8/2019 | Gordon et al. |
| 10,494,107 B2 | 12/2019 | Dardona et al. |
| 10,578,498 B2 | 3/2020 | Parsons et al. |
| 10,605,637 B2 | 3/2020 | Gordon et al. |
| 10,613,112 B2 | 4/2020 | Golly et al. |
| 10,823,753 B2 * | 11/2020 | Seidel ..................... G01P 5/165 |
| 10,884,014 B2 | 1/2021 | Golly et al. |
| 10,955,433 B2 | 3/2021 | Jacob et al. |
| 11,167,861 B2 | 11/2021 | Golly et al. |
| 11,237,031 B2 * | 2/2022 | Wigen ................. G01P 13/025 |
| 11,237,183 B2 * | 2/2022 | Sanden ................. G01P 5/165 |
| 2004/0085211 A1 | 5/2004 | Gotfried |
| 2004/0093953 A1 | 5/2004 | Gilkison et al. |
| 2004/0177683 A1 | 9/2004 | Ice |
| 2004/0244477 A1 | 12/2004 | Zippold et al. |
| 2005/0011285 A1 | 1/2005 | Giterman |
| 2005/0179542 A1 | 8/2005 | Young |
| 2006/0144007 A1 | 7/2006 | Azarin |
| 2006/0207753 A1 | 9/2006 | Sanatgar et al. |
| 2007/0045477 A1 | 3/2007 | Armstrong et al. |
| 2007/0079639 A1 | 4/2007 | Hsu |
| 2007/0108047 A1 | 5/2007 | Chang et al. |
| 2010/0000885 A1 | 1/2010 | Downes |
| 2010/0032292 A1 | 2/2010 | Wang et al. |
| 2010/0123549 A1 | 5/2010 | Lickfelt et al. |
| 2011/0036160 A1 | 2/2011 | Pineau et al. |
| 2011/0240625 A1 | 10/2011 | Takenouchi |
| 2012/0118076 A1 | 5/2012 | Foster |
| 2012/0280498 A1 | 11/2012 | Irwin et al. |
| 2013/0014586 A1 | 1/2013 | Walling et al. |
| 2013/0145862 A1 | 6/2013 | Leblond et al. |
| 2013/0287378 A1 | 10/2013 | Kida et al. |
| 2014/0042140 A1 | 2/2014 | Lin et al. |
| 2014/0042149 A1 | 2/2014 | Kamitani |
| 2014/0053644 A1 | 2/2014 | Anderson et al. |
| 2014/0116154 A1 | 5/2014 | Seidel et al. |
| 2014/0156226 A1 | 6/2014 | Hashemian et al. |
| 2014/0285943 A1 | 9/2014 | Watanabe et al. |
| 2014/0332192 A1 | 11/2014 | Cosby, II et al. |
| 2015/0356393 A1 | 12/2015 | Daoura et al. |
| 2016/0091355 A1 | 3/2016 | Mesnard et al. |
| 2016/0280391 A1 | 9/2016 | Golly et al. |
| 2016/0304210 A1 | 10/2016 | Wentland et al. |
| 2017/0052046 A1 | 2/2017 | Gordon et al. |
| 2017/0086656 A1 | 3/2017 | Hiratsuka |
| 2017/0092030 A1 | 3/2017 | Badger, II |
| 2017/0108360 A1 | 4/2017 | Wong et al. |
| 2017/0110838 A1 | 4/2017 | Sasaki |
| 2017/0115139 A1 | 4/2017 | Wong et al. |
| 2017/0129616 A1 | 5/2017 | Coat-Lenzotti et al. |
| 2017/0169974 A1 | 6/2017 | Miyakawa et al. |
| 2017/0199063 A1 | 7/2017 | Gordon et al. |
| 2017/0256340 A1 | 9/2017 | Dos Santos E Lucato et al. |
| 2017/0369175 A1 | 12/2017 | Gordon et al. |
| 2017/0370960 A1 * | 12/2017 | Benning ............ G01K 13/028 |

(56) References Cited

U.S. PATENT DOCUMENTS

| | | |
|---|---|---|
| 2018/0079525 A1 | 3/2018 | Krueger et al. |
| 2018/0124874 A1 | 5/2018 | Dardona et al. |
| 2018/0128849 A1 | 5/2018 | Wong et al. |
| 2018/0160482 A1 | 6/2018 | Hartzler et al. |
| 2018/0175518 A1 | 6/2018 | Mori et al. |
| 2018/0209863 A1 | 7/2018 | Golly et al. |
| 2018/0238723 A1 | 8/2018 | Seidel et al. |
| 2018/0259547 A1 | 9/2018 | Abdullah et al. |
| 2018/0259548 A1 | 9/2018 | Anderson et al. |
| 2018/0281279 A1 | 10/2018 | Barocio et al. |
| 2018/0372556 A1 | 12/2018 | Parsons et al. |
| 2018/0372559 A1 | 12/2018 | Parsons et al. |
| 2019/0001787 A1 | 1/2019 | Takeuchi |
| 2019/0186974 A1 | 6/2019 | Golly et al. |
| 2019/0219611 A1 | 7/2019 | Lyding et al. |
| 2019/0234986 A1 | 8/2019 | Ortelt |
| 2019/0293676 A1 | 9/2019 | Jacob et al. |
| 2019/0383848 A1 | 12/2019 | Matheis et al. |
| 2020/0055582 A1 | 2/2020 | Botura et al. |
| 2020/0109982 A1 | 4/2020 | Jacob et al. |
| 2020/0114428 A1 | 4/2020 | Golly et al. |
| 2020/0123650 A1 | 4/2020 | Poteet et al. |
| 2020/0141964 A1 | 5/2020 | Marty et al. |
| 2020/0191823 A1* | 6/2020 | Seidel .................. B64D 43/02 |
| 2020/0233007 A1 | 7/2020 | Jacob et al. |
| 2020/0309808 A1 | 10/2020 | Golly et al. |
| 2021/0022215 A1 | 1/2021 | Jacob et al. |
| 2021/0048322 A1 | 2/2021 | Poteet et al. |
| 2021/0055143 A1 | 2/2021 | Wigen et al. |
| 2021/0127458 A1 | 4/2021 | Jacob et al. |
| 2021/0140989 A1 | 5/2021 | Buenz et al. |
| 2022/0024602 A1 | 1/2022 | Golly et al. |

FOREIGN PATENT DOCUMENTS

| | | |
|---|---|---|
| CN | 109625290 A | 4/2019 |
| CN | 210037862 U | 2/2020 |
| EP | 0737315 A1 | 10/1996 |
| EP | 2775310 A1 | 9/2014 |
| EP | 3073275 A2 | 9/2016 |
| EP | 3076185 A1 | 10/2016 |
| EP | 3133403 A1 | 2/2017 |
| EP | 3159700 A1 | 4/2017 |
| EP | 3214704 A1 | 9/2017 |
| EP | 3499217 A2 | 6/2019 |
| GB | 562880 | 7/1944 |
| GB | 1118794 | 7/1968 |
| GB | 2561393 A | 10/2018 |
| KR | 20120069201 A | 6/2012 |
| KR | 101184780 B1 | 9/2012 |
| WO | WO9613727 A1 | 5/1996 |
| WO | WO9816837 A1 | 4/1998 |
| WO | WO0111582 A1 | 2/2001 |
| WO | WO0167115 A1 | 9/2001 |
| WO | WO0177622 A2 | 10/2001 |

OTHER PUBLICATIONS

Extended European Search Report for European Patent Application No. 18207317.1, dated May 24, 2019, 7 pages.
Extended European Search Report for European Patent Application No. 19207424.3, dated Mar. 13, 2020, 8 pages.
Extended European Search Report for European Patent Application No. 19213580.4, dated Jun. 26, 2020, 13 pages.
Extended European Search Report for European Patent Application No. 19215840.0, dated Jul. 3, 2020, 14 pages.
Extended European Search Report for European Patent Application No. 19215832.7, dated Aug. 10, 2020, 8 pages.
Extended European Search Report for European Patent Application No. 20205705.5, dated Apr. 30, 2021, 10 pages.
Extended European Search Report for European Patent Application No. 22197719.2, dated Jan. 27, 2023, 8 pages.

* cited by examiner

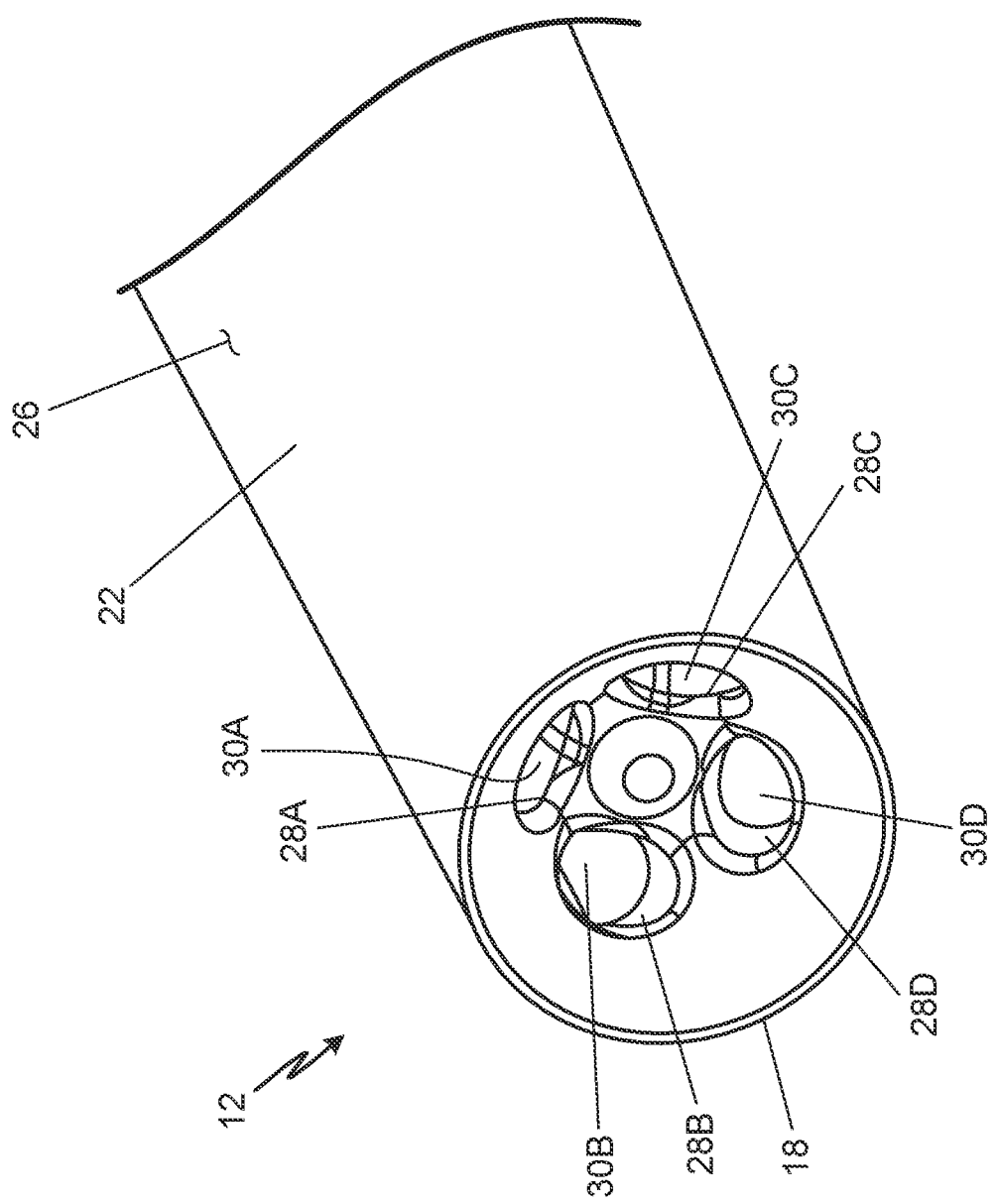

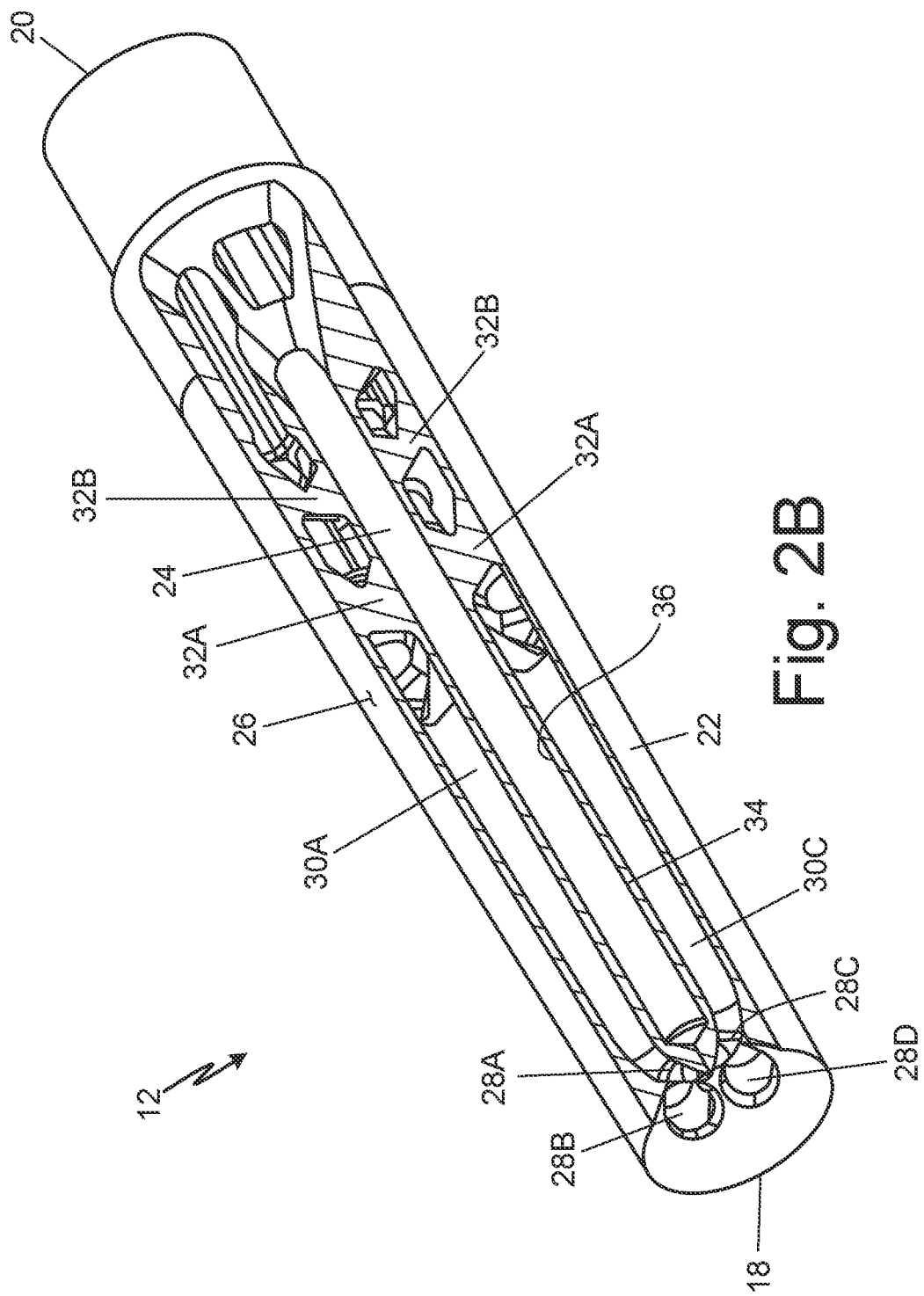

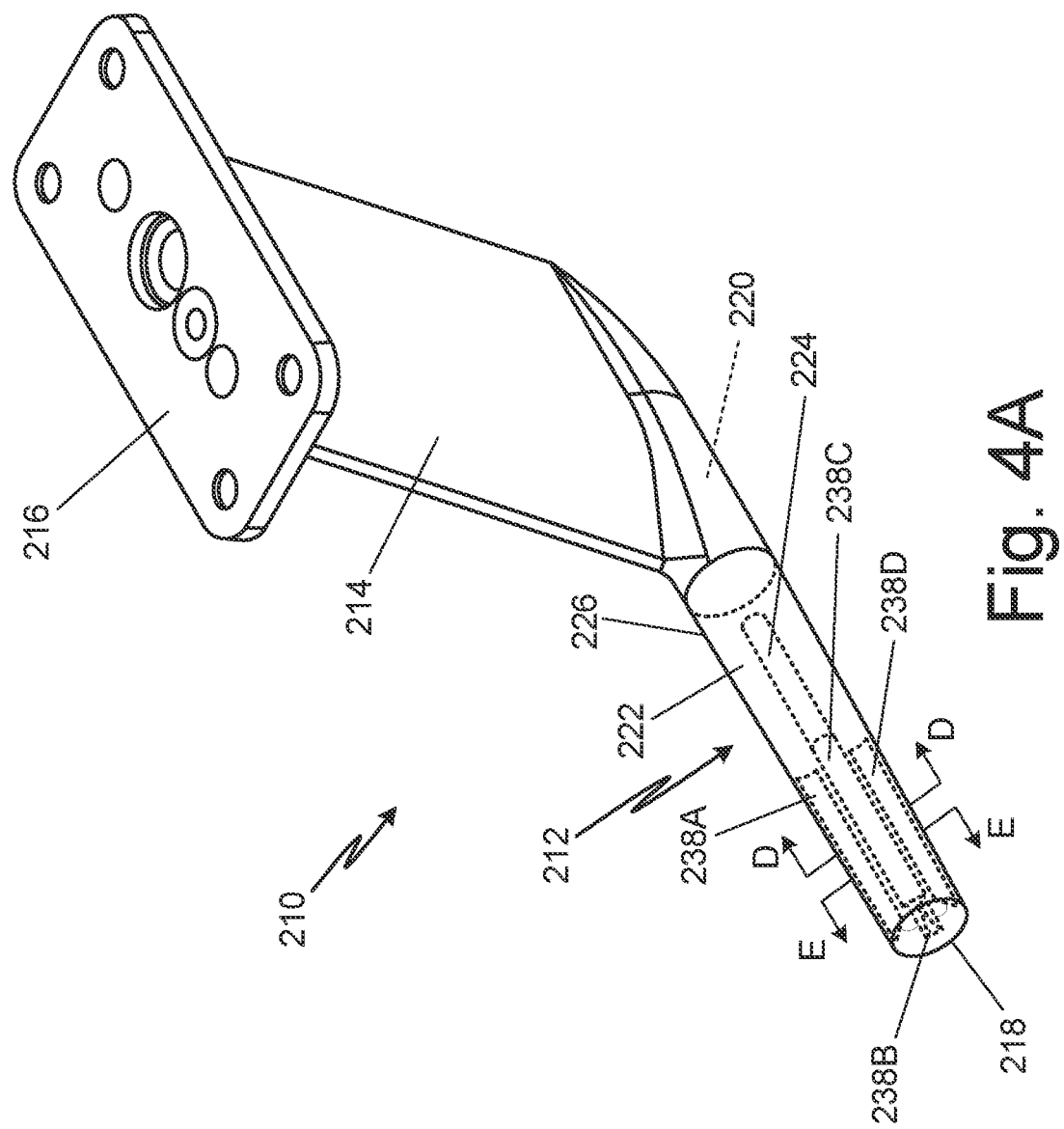

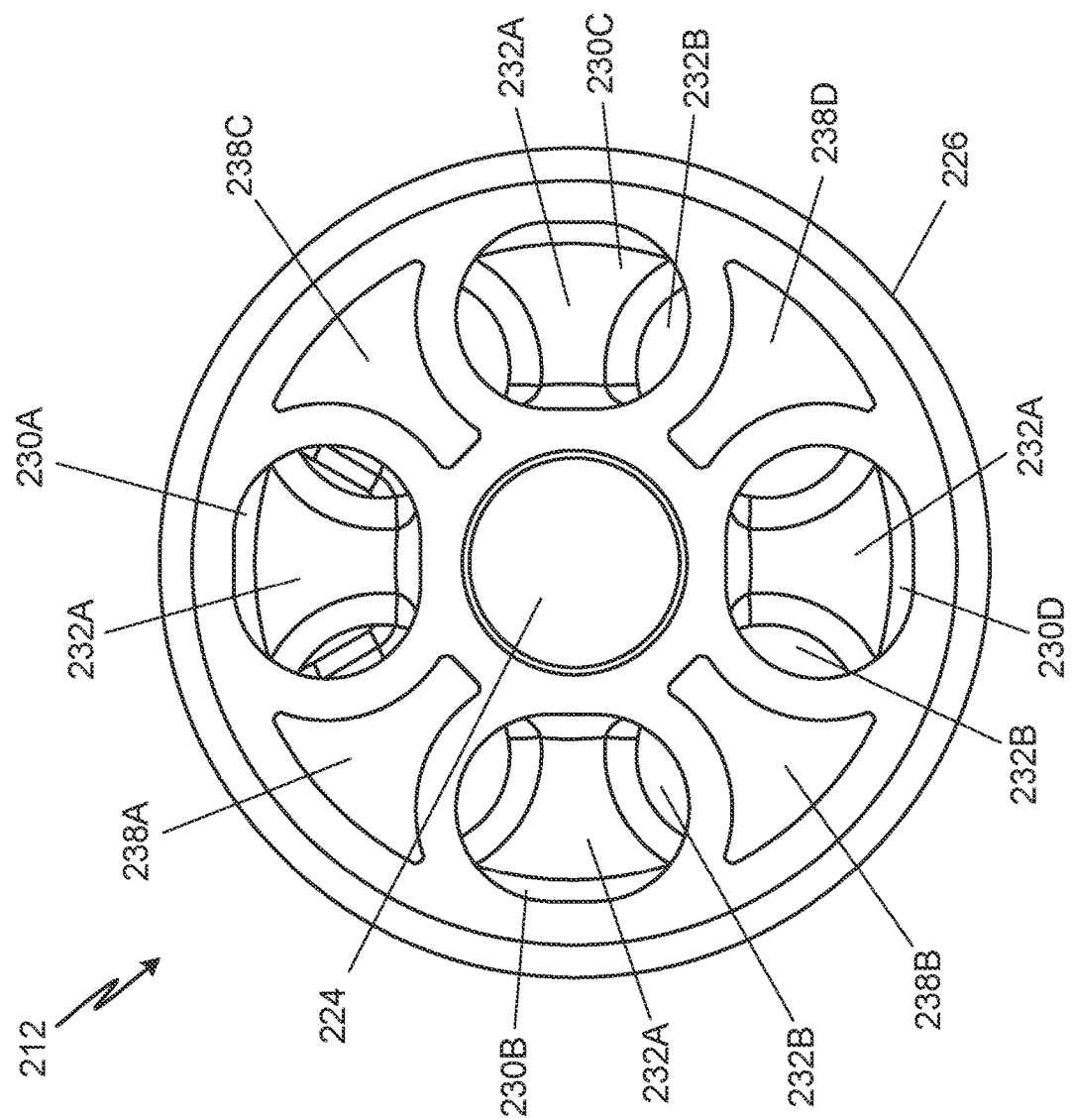

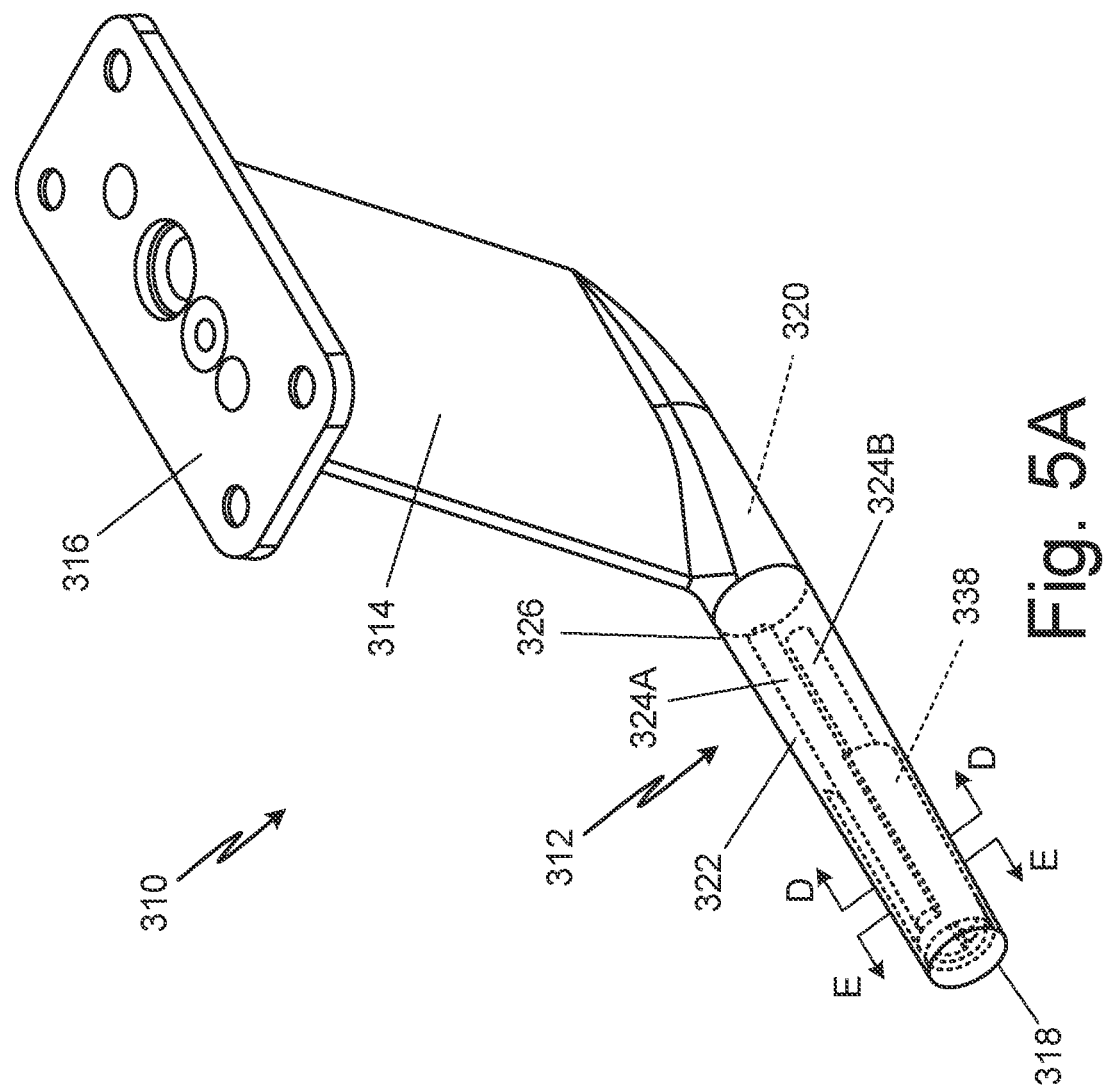

AIR DATA PROBE WITH ENHANCED CONDUCTION INTEGRATED HEATER BORE AND FEATURES

CROSS-REFERENCE TO RELATED APPLICATION(S)

This application is related to U.S. application Ser. No. 17/492,319, entitled AIR DATA PROBE WITH INTEGRATED HEATER BORE AND FEATURES, filed concurrently, which is incorporated by reference in its entirety.

BACKGROUND

The present disclosure relates generally to air data probes, and in particular, to heaters for air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which are often cold. As such, heaters are positioned within air data probes to ensure the air data probes function properly in liquid water, ice crystal, and mixed phase icing conditions. It can be difficult to successfully arrange the heater within the air data probe.

SUMMARY

A probe head of an air data probe includes a body extending from a first end to a second end of the probe head and a rod heater. The body includes an inlet adjacent the first end of the probe head, an air passageway extending through the body from the inlet to a second end of the probe head, a water dam extending radially through the body such that the air passageway is redirected around the water dam, a heater bore extending within the body, and an enhanced conduction area between heater bore and an exterior surface of the probe head. The inlet, the air passageway, the water dam, and the heater bore are all unitary to the body. The rod heater is positioned within the heater bore.

BRIEF DESCRIPTION OF THE DRAWINGS

FIG. 2A is a partial perspective view of a probe head of the air data probe.

FIG. 2B is a cut away view of a probe head of the air data probe.

FIG. 4A is a perspective top view of the air data probe showing enhanced conduction areas of a third embodiment of the probe head.

FIG. 4D is a cross-sectional view of the third embodiment of the probe head taken along line D-D of FIG. 4A.

FIG. 5A is a perspective top view of the air data probe showing an enhanced conduction area of the fourth embodiment of the probe head.

DETAILED DESCRIPTION

In general, the present disclosure describes an air data probe with a probe head that has an additively manufactured body including unitary water dams, air passageways, and one or more heater bores for a rod heater or heaters, resulting in simplified assembly, enhanced repeatability, and efficient heat distribution. The probe head may also include one or more enhanced conduction areas between or extending from one or more heater bores and an exterior surface of the body to increase and further tailor the heat distribution.

Figure 1:
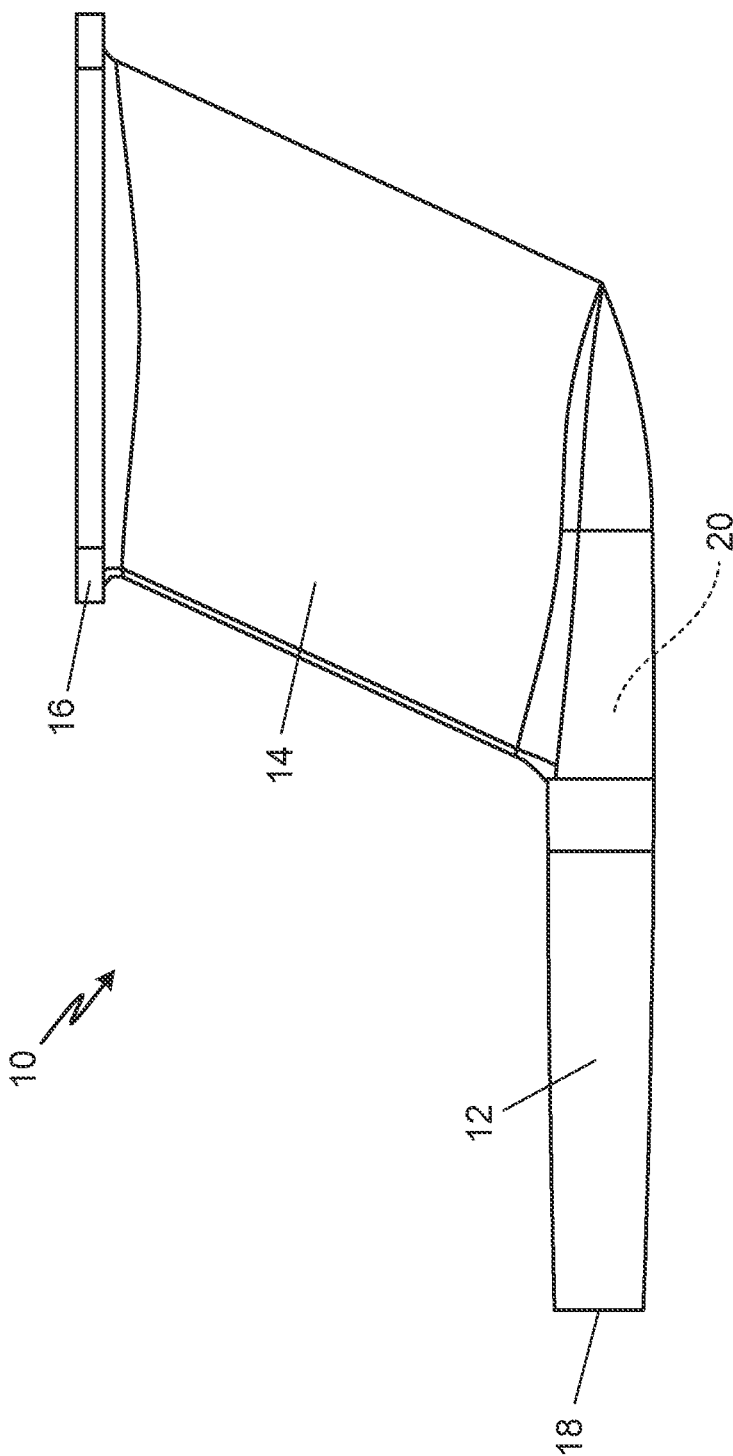
FIG. 1 is a perspective view of an air data probe.

FIG. 1 is a perspective view of air data probe 10. Air data probe 10 includes probe head 12, strut 14, and mounting flange 16. Probe head 12 includes first end 18 and second end 20.

Air data probe 10 may be a pitot probe, a pitot-static probe, or any other suitable air data probe. Probe head 12 is the sensing head of air data probe 10. Probe head 12 is a forward portion of air data probe 10. Probe head 12 has one or more ports positioned in probe head 12. Internal components of air data probe 10 are located within probe head 12. Probe head 12 is connected to a first end of strut 14. Strut 14 is blade-shaped. Internal components of air data probe 10 are located within strut 14. Strut 14 is adjacent mounting flange 16. A second end of strut 14 is connected to mounting flange 16. Mounting flange 16 makes up a mount of air data probe 10. Mounting flange 16 is connectable to an aircraft.

Probe head 12 has first end 18 at one end, or an upstream end, and second end 20 at an opposite end, or a downstream end. First end 18 of probe head 12 makes up a tip of probe head 12. Second end 20 of probe head 12 is connected to strut 14.

Air data probe 10 is configured to be installed on an aircraft. Air data probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air from surrounding external airflow and communicates air pressures pneumatically through internal components and passages of probe head 12 and strut 14. Pressure measurements are communicated to a flight computer and can be used to generate air data parameters related to the aircraft flight condition.

Figure 2C:
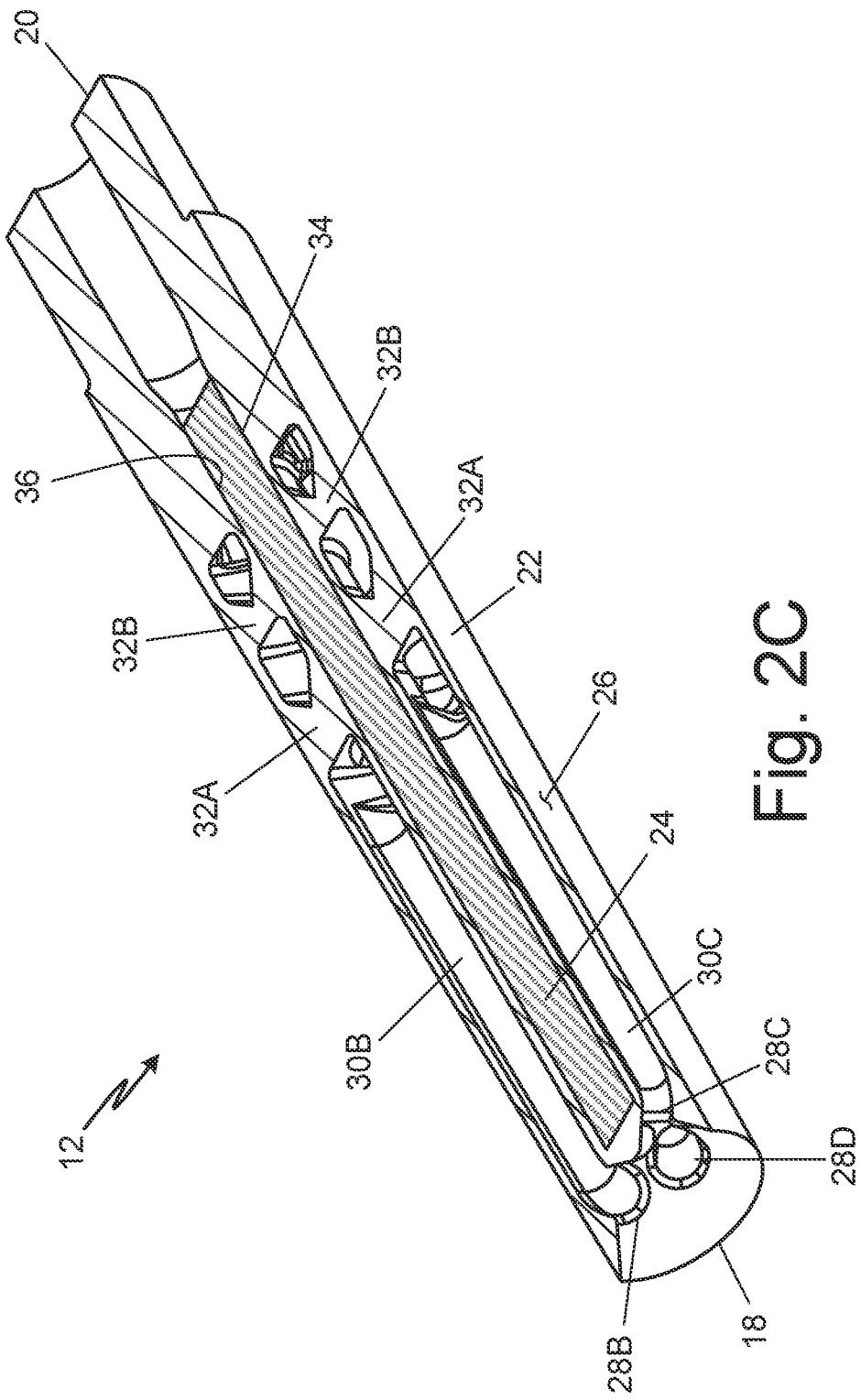
FIG. 2C is a cross-sectional view of the probe head of the air data probe.
Figure 2D:
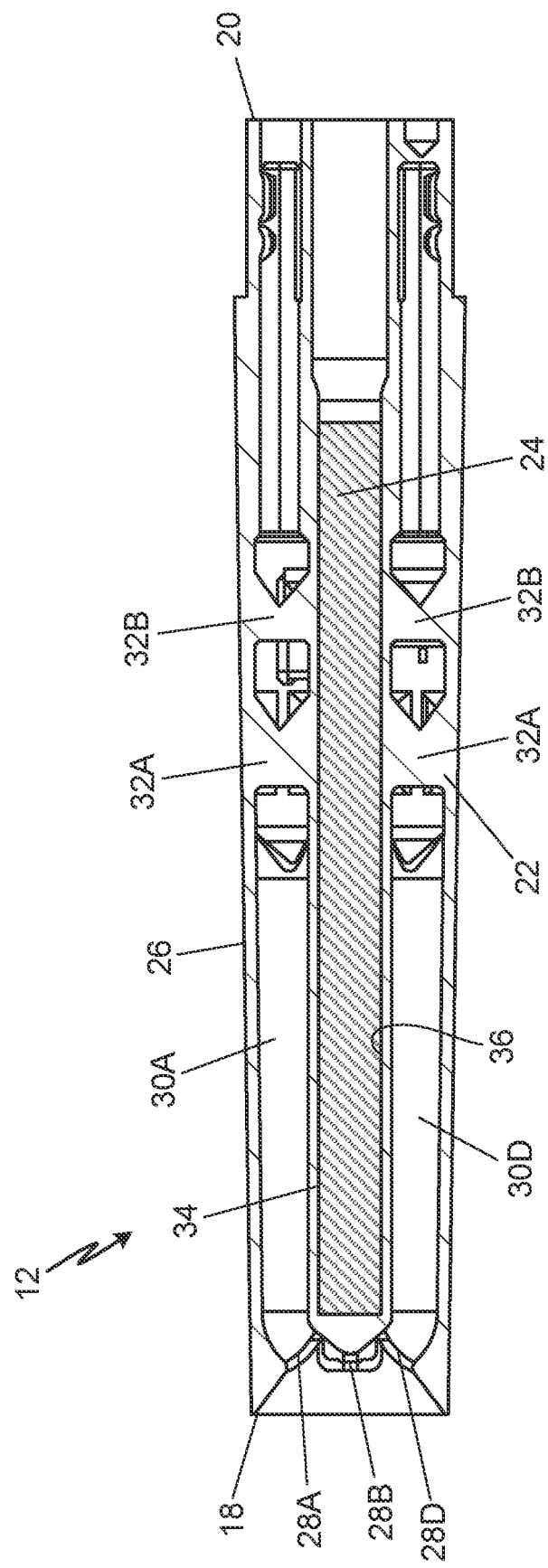
FIG. 2D is a cross-sectional view of the probe head of the air data probe.
Figure 2E:
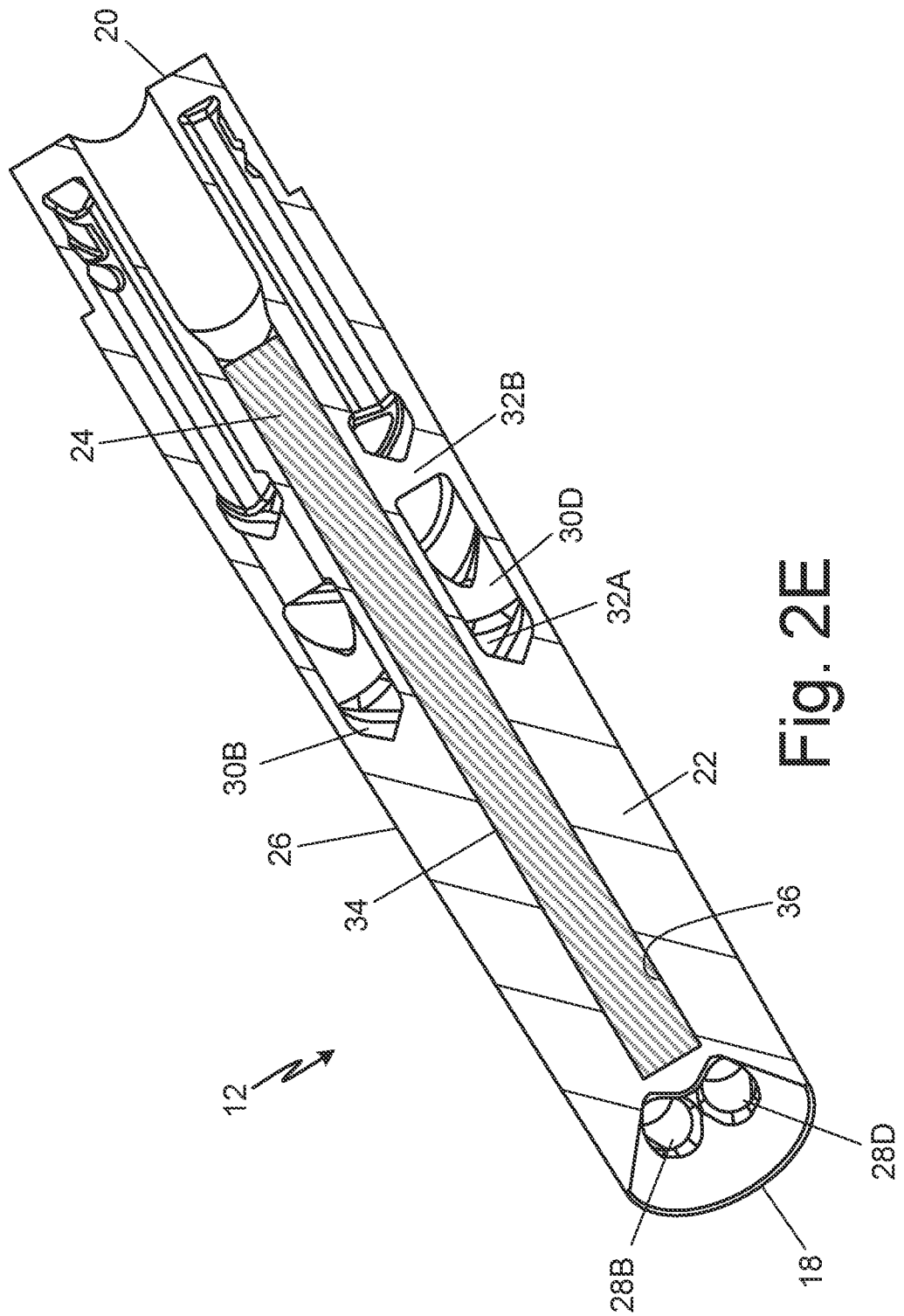
FIG. 2E is a cross-sectional view of the probe head of the air data probe.
Figure 2F:
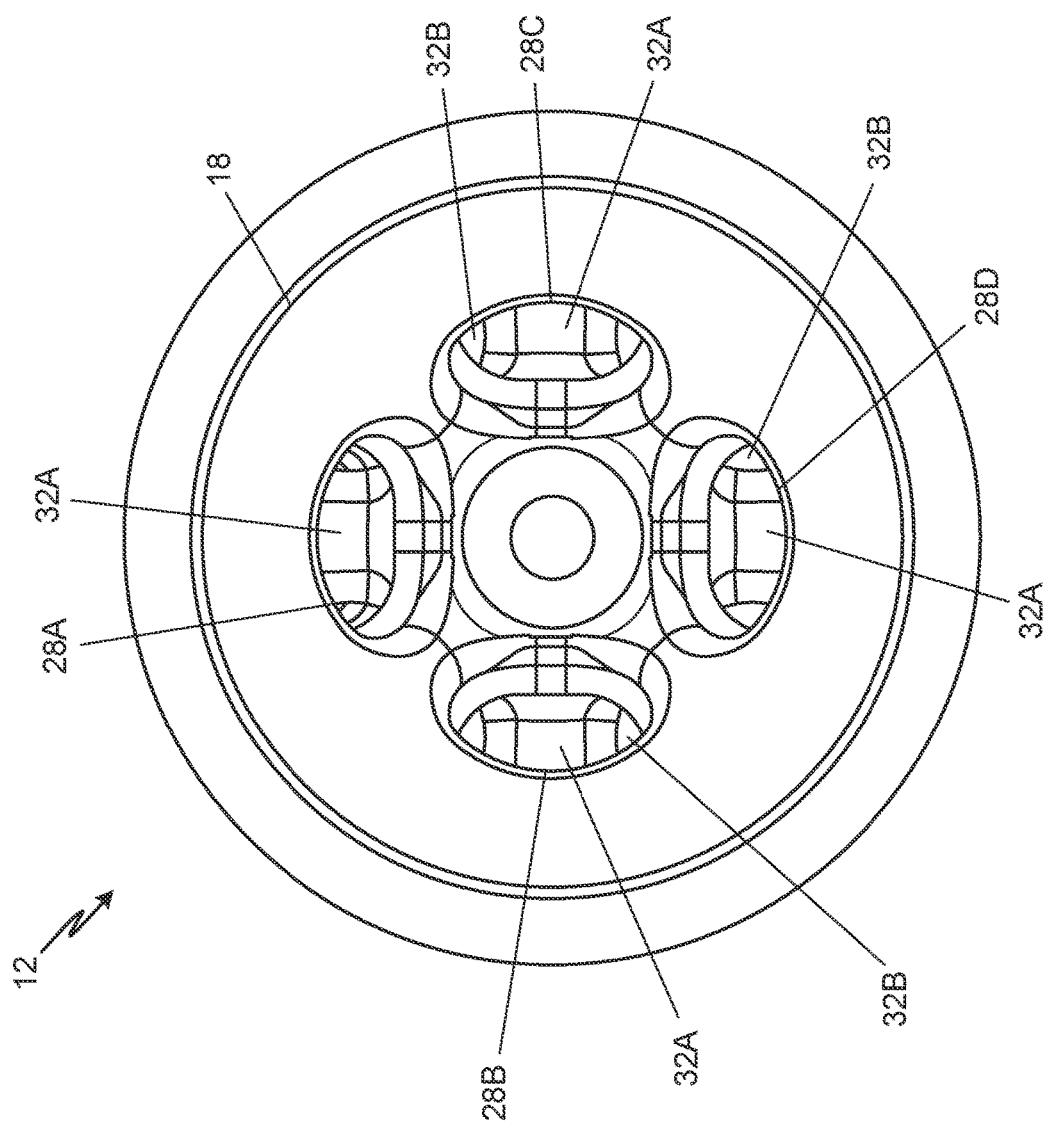
FIG. 2F is a front view of the probe head of the air data probe.

FIG. 2A is a partial perspective view of probe head 12 of air data probe 10. FIG. 2B is a cut away view of probe head 12 of air data probe 10. FIG. 2C is a cross-sectional view of probe head 12 of air data probe 10. FIG. 2D is a cross-sectional view of probe head 12 of air data probe 10. FIG. 2E is a cross-sectional view of probe head 12 of air data probe 10. FIG. 2F is a front view of probe head 12 of air data probe 10. FIGS. 2A, 2B, 2C, 2D, 2E, and 2F will be discussed together. Air data probe 10 includes probe head 12. Probe head 12 includes first end 18, second end 20, body 22, and heater 24. Body 22 includes exterior surface 26, inlets 28A, 28B, 28C, and 28D, air passageways 30A, 30B, 30C, and 30D, water dams 32A and 32B, and heater bore 34. Heater bore 34 includes interior surface 36.

Probe head 12 has first end 18 making up the tip of probe head 12. Second end 20 is opposite first end 18. Second end 20 of probe head 12 is connected to strut 14 (shown in FIG. 1). Body 22 of probe head 12 extends from first end 18 to second end 20. Body 22 is a unitary, or single-piece, structure. Body 22 is additively manufactured and made of nickel or any other suitable material. Heater 24 is positioned within body 22. In this embodiment, a single heater 24 extends through a center, or down the middle, of body 22. Heater 24 is a rod heater, which includes both rod and rod-like structures. Heater 24 may be comprised of an electric resistive wire heater helically wound around a ceramic rod-like core. Heater 24 may be tailored such that heater 24 has a varying amount of power, or different amounts of power axially along heater 24. For example, electric resistive wire may be wound to result in tighter or looser coils on ceramic core to increase or decrease the amount of coils, and thus the power density along heater 24. Heater 24 may have more tightly wound coils at an end of heater 24 adjacent first end 18 of probe head 12 to deliver a greater amount of heat to the tip. Alternatively, heater 24 may be uniform such that the power density of heater 24 is uniform axially along heater 24.

Exterior surface 26 of body 22 is an outer surface of body 22. Exterior surface 26 of body 22 is the outer surface of probe head 12. As such, external airflow contacts exterior surface 26. Body 22 has inlets 28A, 28B, 28C, and 28D near first end 18 of probe head 12. Inlets 28A, 28B, 28C, and 28D are openings in body 22. In this embodiment, body 22 has four inlets 28A, 28B, 28C, and 28D. In alternate embodiments, body 22 has any suitable number of inlets 28. Each inlet 28A, 28B, 28C, 28D is connected to a respective air passageway 30A, 30B, 30C, and 30D. As such, body 22 has four air passageways 30A, 30B, 30C, and 30D. Air passageways 30A, 30B, 30C, and 30D extend from respective inlets 28A, 28B, 28C, and 28D to second end 20 of probe head 12. Air passageways 30A, 30B, 30C, and 30D surround heater 24 such that air passageways 30A, 30B, 30C, and 30D are between heater 24 and exterior surface 26 of body 22. Air passageways 30A, 30B, 30C, and 30D extend in substantially straight lines and twist up to 90 degrees around water dams 32A and 32B. As such, air passageways 30A, 30B, 30C, and 30D may have an undulating geometry from first end 18 to second end 20 such that air passageways 30A, 30B, 30C, and 30D are redirected around water dams 32A and 32B. Water dams 32A and 32B are positioned in lines of sight of inlets 28A, 28B, 28C, and 28D. Water dams 32A extend radially. In this embodiment, body 22 has two water dams 32A and 32B spaced axially from each other. In alternate embodiments, body 22 may have any number of water dams 32A and 32B.

Heater bore 34 is a cylindrical opening, or well, extending through a center of body 22. Heater bore 34 is positioned between first end 18 and second end 20. Heater bore 34 is shaped to accept rod heater 24. In this embodiment, body 22 has a single heater bore 34 for a single heater 34. In alternate embodiments, body 22 may have a plurality of heater bores 34 to accommodate a plurality of heaters 34. Heater bore 34 has annular interior surface 36 that contacts heater 24. Specifically, heater 24 is slid into heater bore 34 such that heater 24 is in contact with interior surface 36 of heater bore 34.

Heater 24 connects to heater circuitry (not shown) at second end 20 of probe head 12, the circuitry going down strut 14 (shown in FIG. 1) to connect to and get power from internal components of air data probe 10. Heater 24 can have different amounts of power along rod heater 24 to distribute more heat or less heat depending on the needs of probe head 12, or power can be uniform along heater 24 to further simplify manufacturing of heater 24.

Thermal resistance of body 22 varies, particularly from heater 24 to exterior surface 26, from first end 18 to second end 20 of probe head 12 due to different amounts of material between heater 24 and exterior surface 26 moving axially from first end 18 to second end 20 of probe head 12. For example, air passageways 30A, 30B, 30C, and 30D can increase or decrease in diameter to increase or decrease the amount of material between heater bore 34 and exterior surface 26, varying the thermal resistance of probe head 12 by having more or less metal to carry heat radially outward from heater 24. Less metal in probe head 12 moving from first end 18 to second end 20 reduces the thermal resistance and results in less heat conduction from heater 24 to exterior surface 26 of probe head 12 moving from first end 18 to second end 20. As such, probe head 12 is conducting less heat near second end 20 and diverting more heat toward first end 18, or tip, of probe head 12.

Air passageways 30A, 30B, 30C, and 30D are not fully linear and twist, or undulate, around heater bore 34 and water dams 32A and 32B to result in a line-of-sight deflection from first end 18. An absence of a straight path from inlets 28A, 28B, 28C, and 28D, at first end 18, to second end 20 of probe head 12, as shown in FIG. 2F, assists in managing water that could get into probe head 12. Water dams 32A and 32B redirect, or knock down, water particles in the airflow moving through air passageways 30A, 30B, 30C, and 30D. Water dams 32A and 32B block ice and water particles in exterior airflow and prevent ice and water particles from having a direct route down air passageways 30A, 30B, 30C, and 30D and through probe head 12.

Traditional air data probes have a wire heater brazed to a body of a probe head. Other components, such as water dams, may also be positioned within and brazed onto traditional probe heads. As such, probe heads of traditional air data probes have complex heaters incorporated into multi-piece assemblies.

Additive manufacturing allows for more complex internal geometry, including air passageways 30A, 30B, 30C, and 30D, water dams 32A and 32B, and heater bore 34, of probe head 12, which is needed for optimal functionality of air data probe 10. Because body 22 is a single unitary piece, air passageways 30A, 30B, 30C, and 30D, water dams 32A and 32B, and heater bore 34 are uniform in size, shape, and position among probe heads 12 to ensure optimal fit and performance as well as repeatability. For example, heater bore 34, water dams 32A and 32B, and air passageways 30A, 30B, 30C, and 30D are combined with rod heater 24 and body 22 ensures the best fit between heater 24 and body 22. Additively manufactured body 22 of probe head 12 allows for easier and more effective use of rod-shaped heater 24.

Rod heater 24 is simpler than a traditional complex heater brazed into a probe head. Because the power density of rod heater 24 can change axially along heater 24, heater 24 still maintains the ability to tailor heat distribution within probe head 12 by enhancing conduction to the portions of probe head 12 that need heat via varied power density of heater 24. Rod heater 24 can be a standardized heater among probe heads 12. Heater 24 is also easier to manufacture and simplifies the assembly process of probe head 12.

The geometry of air passageways 30A, 30B, 30C, and 30D allows air passageways 30A, 30B, 30C, and 30D to twist around water dams 32A and 32B positioned in their direct path from first end 18. Water dams 32A and 32B prevent ice and water particles from external airflow from moving through probe head 12 and decreasing functionality of air data probe 10.

Utilizing additive manufacturing to create more complex internal geometry of body 22, which has a complex one-piece shape that includes air passageways 30A, 30B, 30C, and 30D, water dams 32A and 32B, and heater bore 34, and integrating a simpler form of a heater via rod heater 24 achieves the internal shapes and passages needed for optimal functionality of probe head 12 while enhancing heat conduction and simplifying manufacturing and assembly of probe head 12.

Figure 3A:
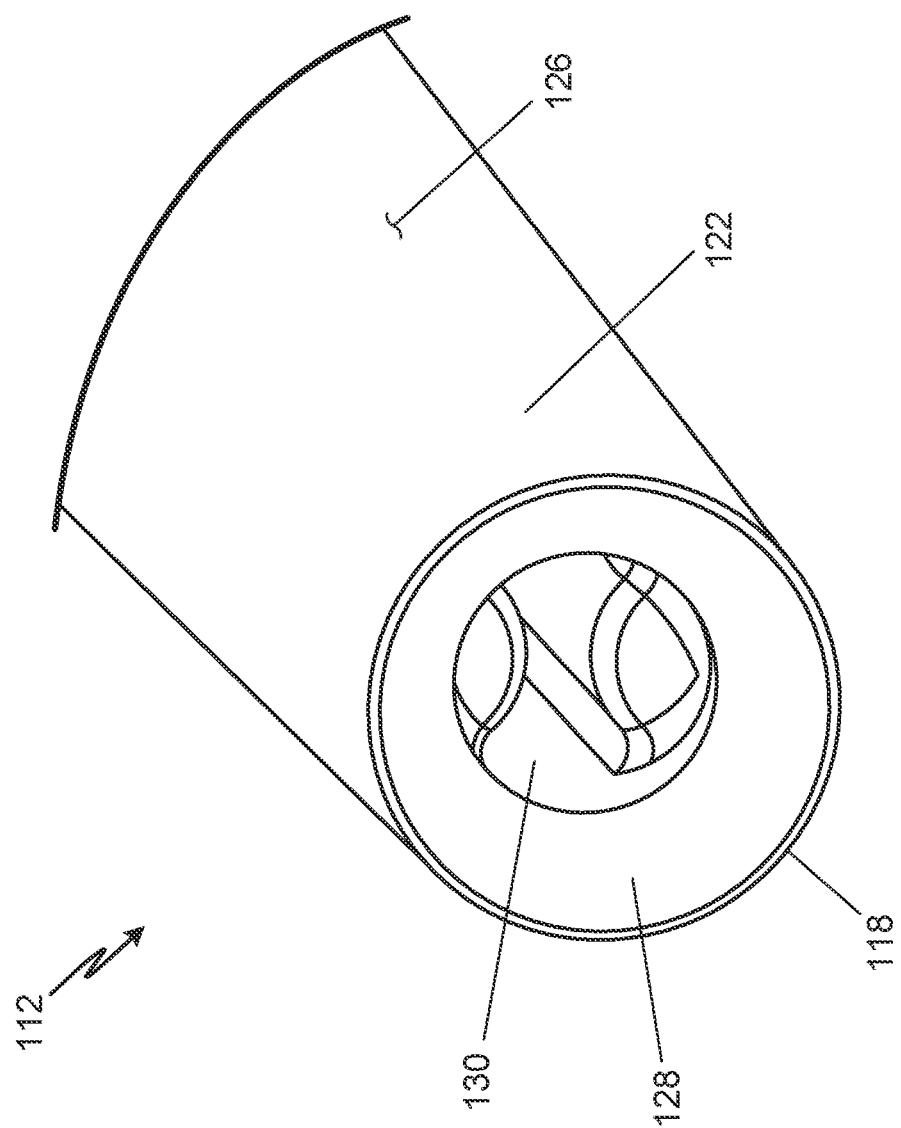
FIG. 3A is a partial perspective view of a second embodiment of a probe head.
Figure 3B:
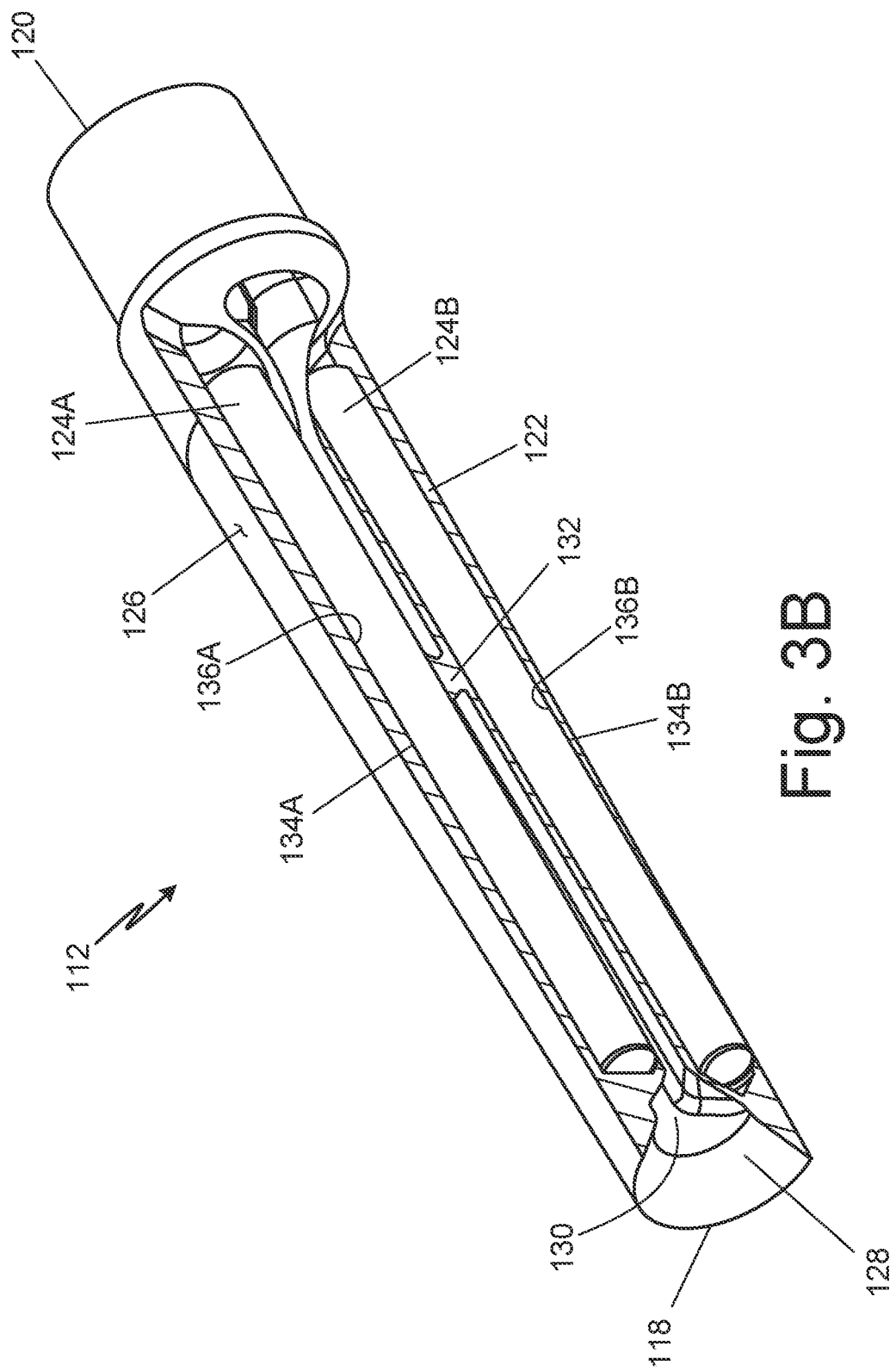
FIG. 3B is a cut away view of a second embodiment of the probe head.
Figure 3C:
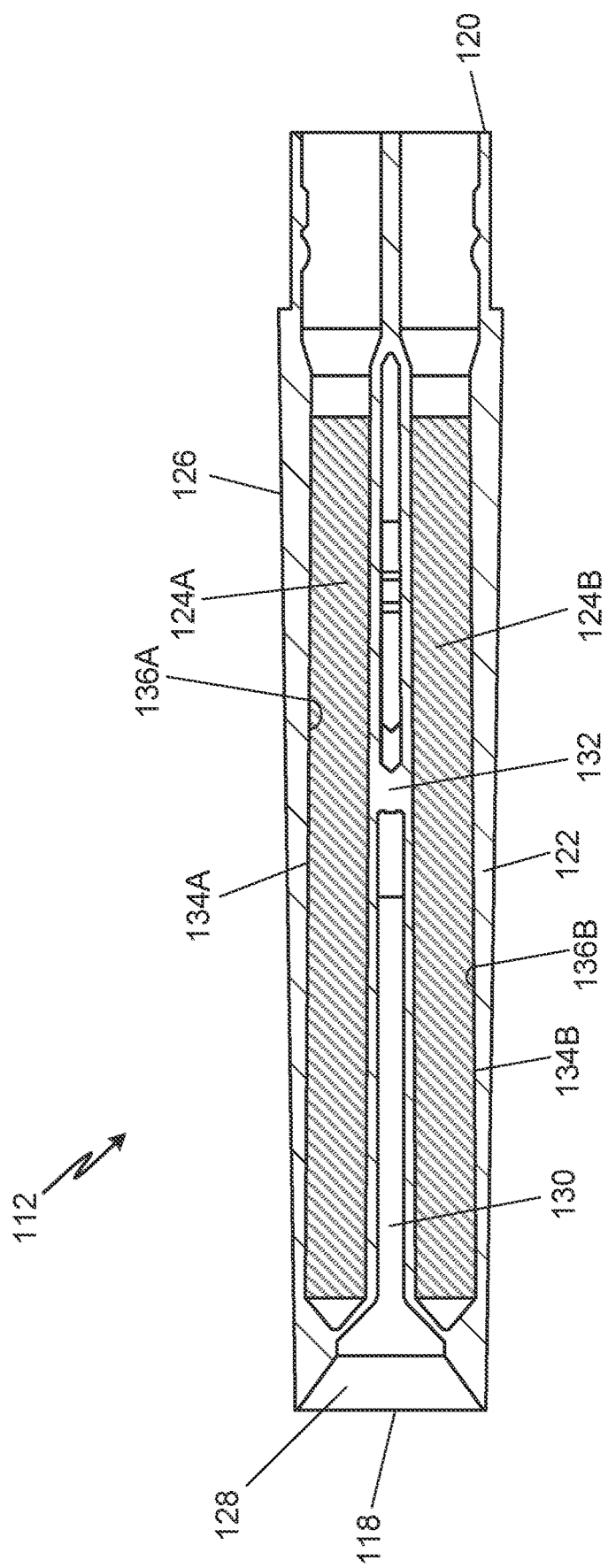
FIG. 3C is a cross-sectional view of the second embodiment of the probe head.
Figure 3D:
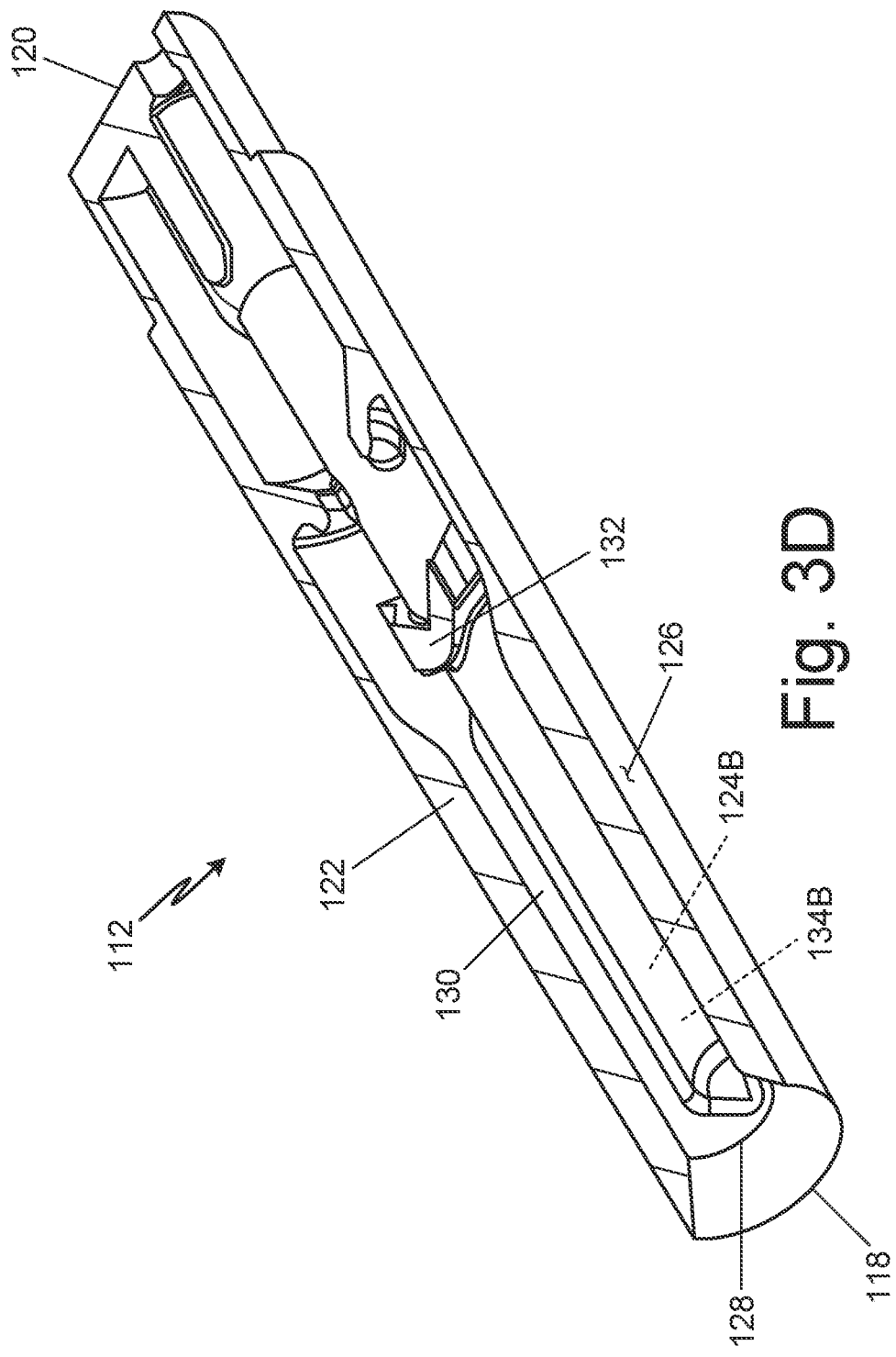
FIG. 3D is a cross-sectional view of the second embodiment of the probe head.
Figure 3E:
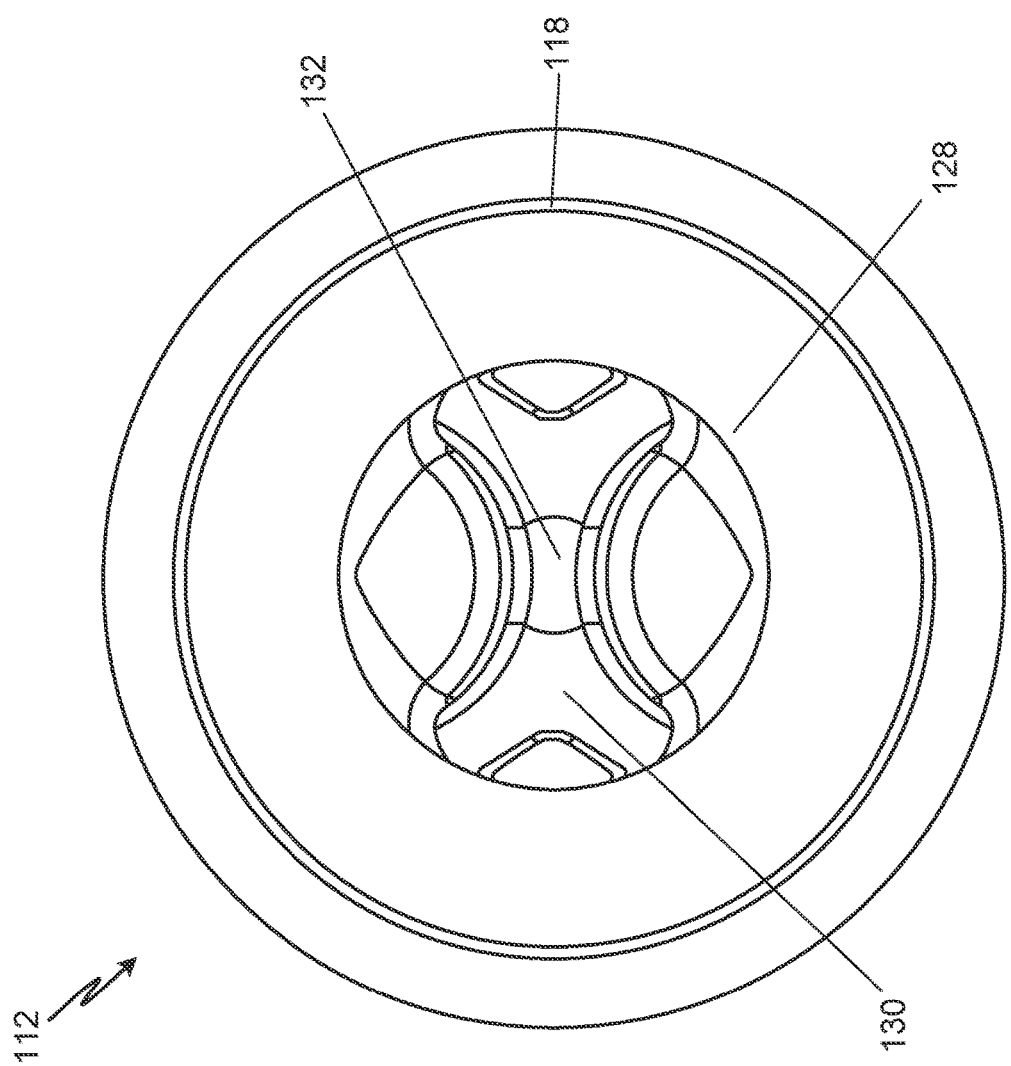
FIG. 3E is an end view of the second embodiment of the probe head.

FIG. 3A is a partial perspective view of probe head 112. FIG. 3B is a cut away view of probe head 112. FIG. 3C is a cross-sectional view of probe head 112. FIG. 3D is a cross-sectional view of probe head 112. FIG. 3E is an end view of probe head 112. FIGS. 3A, 3B, 3C, 3D, and 3E will be discussed together. Probe head 112 includes first end 118, second end 120, body 122, and heaters 124A and 124B. Body 122 includes exterior surface 126, inlet 128, air passageway 130, water dam 132, and heater bores 134A and 134B. Heater bore 134A includes interior surface 136A. Heater bore 134B includes interior surface 136B.

Probe head 112 has first end 118 making up the tip of probe head 112. Second end 120 is opposite first end 118. Second end 120 of probe head 112 is connected to strut 14 (shown in FIG. 1). Body 122 of probe head 112 extends from first end 118 to second end 120. Body 122 is a unitary, or single-piece, structure. Body 122 is additively manufactured and made of nickel or any other suitable material. Heaters 124A and 124B are positioned within body 122. In this embodiment, probe head 112 has two side-by-side heaters 124A and 124B. Heaters 124A and 124B are spaced radially from each other. As such, heaters 124A and 124B are positioned adjacent exterior surface 126 of body 126. Heaters 124A and 124B are rod heaters, which includes both rod and rod-like structures. Each heater 124A, 124B may be comprised of an electric resistive wire heater helically wound around a ceramic rod-like core. Each heater 124A, 124B may be tailored such that heater 124A, 124B has different amounts of power along heater 124A, 124B. For example, electric resistive wire may be wound to result in tighter or looser coils on ceramic core to increase or decrease the amount of coils, and thus the power density along heater 124A, 124B. Heater 124A, 124B may have more tightly wound coils at an end of heater 124A, 124B adjacent first end 118 of probe head 112 to deliver a greater amount of heat to the tip. Alternatively, heater 124A, 124B may be uniform such that the power density of heater 124A, 124B is uniform along heater 124A, 124B.

Exterior surface 126 of body 122 is an outer surface of body 122. Exterior surface 126 of body 122 is the outer surface of probe head 112. As such, external airflow contacts exterior surface 126. Body 122 has inlet 128 near first end 118 of probe head 112. Inlet 128A is an opening in body 122. In this embodiment, body 122 has a single inlet 128A. Inlet 128 is connected to air passageway 130. As such, body 122 has a single air passageway 130. Air passageway 130 extends from inlets 128 to second end 120 of probe head 112. Air passageway 130 extends through a center, or down the middle, of body 122. A majority of air passageway 130 extends between heaters 124A and 124B such that heaters 124A and 124B are between a majority of air passageway 130 and exterior surface 126 of body 122. Air passageway 130 extends in a substantially straight line and twists up to 90 degrees around water dam 132. As such, air passageway 130 may have an undulating geometry from first end 118 to second end 120 such that air passageway 130 is redirected around water dam 132. Water dam 132 is positioned in the line of sight of inlet 128. Water dam 132 extends radially. In this embodiment, body 122 has a single water dam 132.

Each heater 124A, 124B is positioned within a heater bore 134A, 134B. Heater bores 134A and 134B are cylindrical openings, or wells, extending along body 122 adjacent exterior surface 126. Heater bores 134A and 134B are positioned between first end 118 and second end 120. Heater bores 134A and 134B are not aligned. Rather, heater bores 134A and 134B are uniformly offset from exterior surface 126 of probe head 112, which is slightly tapered. Each heater bore 134A, 134B is shaped to accept a respective rod heater 124A, 124B. In this embodiment, body 122 has two heater bores 134A and 134B to accommodate two heaters 134A and 134B. In alternate embodiments, probe head 112 may have one or more than two heaters 124A and 124B, each heater 124A, 124B positioned within a respective heater bore 134A, 134B. Each heater bore 134A, 134B has annular interior surface 136A, 136B that contacts respective heater 124A, 124B. Each heater 124A, 124B is slid into a respective heater bore 134A, 134B such that each heater 124A, 124B is in contact with an interior surface of heater bore 134A, 134B.

Heaters 124A and 124B connect to heater circuitry (not shown) at second end 120 of probe head 112, the circuitry going down strut 14 (shown in FIG. 1) to connect to and get power from internal components of air data probe 10. Heaters 124A and 124B can have different amounts of power along rod heaters 124A and 124B to distribute more heat or less heat depending on the needs of probe head 112, or power can be uniform along heaters 124A and 124B to further simplify manufacturing of heaters 124A and 124B.

Thermal resistance of body 122 varies, particularly from each heater 124A, 124B to exterior surface 126, from first end 118 to second end 120 of probe head 112 due to different amounts of material between each heater 124A, 124B and exterior surface 126 moving axially from first end 118 to second end 120 of probe head 112. The thermal resistance of probe head 112 can be varied by having more or less metal to carry heat radially outward from heaters 124A and 124B. Less metal in probe head 112 moving from first end 118 to second end 120 reduces the thermal resistance and results in less heat conduction from heaters 124A and 124B to exterior surface 126 of probe head 112 moving from first end 118 to second end 120. As such, probe head 112 may conduct less heat near second end 120 and divert more heat toward first end 118, or tip, of probe head 112.

Air passageway 130 is not fully linear and twists, or undulates, around heater bores 134A and 134B and water dam 132 to result in a line-of-sight deflection from first end 118. An absence of a straight path from inlet 128 at first end 118 to second end 120 of probe head 112, as shown in FIG. 3E, assists in managing water that could get into probe head 112. Water dam 132 redirects, or knocks down, water particles in the airflow moving through air passageway 130. Water dam 132 blocks ice and water particles in exterior airflow and prevents ice and water particles from having a direct route down air passageway 130 and through probe head 112.

Additive manufacturing allows for more complex internal geometry, including air passageway 130, water dam 132, and heater bores 134A and 134B, of probe head 112, which is needed for optimal functionality of air data probe 10. For example, probe head 112 is able to have two heater bores 134A and 134B, positioned exactly where needed, as well as the required internal geometry of air passageway 130 and water dam 132 that probe head 112 requires in order to function properly due to additively manufacturing probe head 112. Because body 122 is a single unitary piece, air passageway 130, water dam 132, and heater bores 134A and 134B are uniform in size, shape, and position among probe heads 112 to ensure optimal fit and performance as well as repeatability. For example, heater bores 134A and 134B, water dam 132, and air passageway 130 are combined with rod heaters 124A and 124B and body 122 ensures the best fit between heaters 124A and 124A and 124B and body 122. Additively manufactured body 122 of probe head 112 allows for easier and more effective use of rod-shaped heaters 124A and 124B.

Additive manufacturing allows for two heaters 124A and 124B, positioned side-by-side, to increase the heating ability of probe head 112 compared to probe head 12 that has a single heater 24, as shown in FIGS. 2A-2F, when more heat is required. Probe head 112 can respond to increased heat demands. Heater bores 134A and 134B are additively manufactured exactly where heat is needed such that heaters 124A and 124B provide enough heat within probe head 112. Further, water dam 132 and air passageway 130 are additively manufactured and shaped differently to accommodate multiple heater bores 134A and 134B. The geometry of air passageway 130 allows air passageway 130 to twist around water dams 132 positioned in its direct path from first end 118. Water dam 132 prevents ice and water particles from external airflow from moving through probe head 112 and decreasing functionality of air data probe 110.

Rod heaters 124A and 124B are simpler than a traditional complex heater brazed into a probe head. Because the power density of rod heaters 124A and 124B can change axially along heaters 124A and 124B, heaters 124A and 124B still maintain the ability to tailor heat distribution within probe head 112 by enhancing conduction to the portions of probe head 112 that need heat via varied power density of heaters 124A and 124B. Rod heaters 124A and 124B can be standardized heaters among probe heads 112. Heaters 124A and 124B are also easier to manufacture and simplify the assembly process of probe head 112.

Utilizing additive manufacturing to create more complex internal geometry of body 122, which has a complex one-piece shape that includes air passageway 130, water dams 132, and heater bores 134A and 134B, and integrating a simpler form of heaters via rod heaters 124A and 124B achieves the internal shapes and passages needed for optimal functionality of probe head 112 while enhancing heat conduction and simplifying manufacturing and assembly of probe head 112.

Figure 4B:
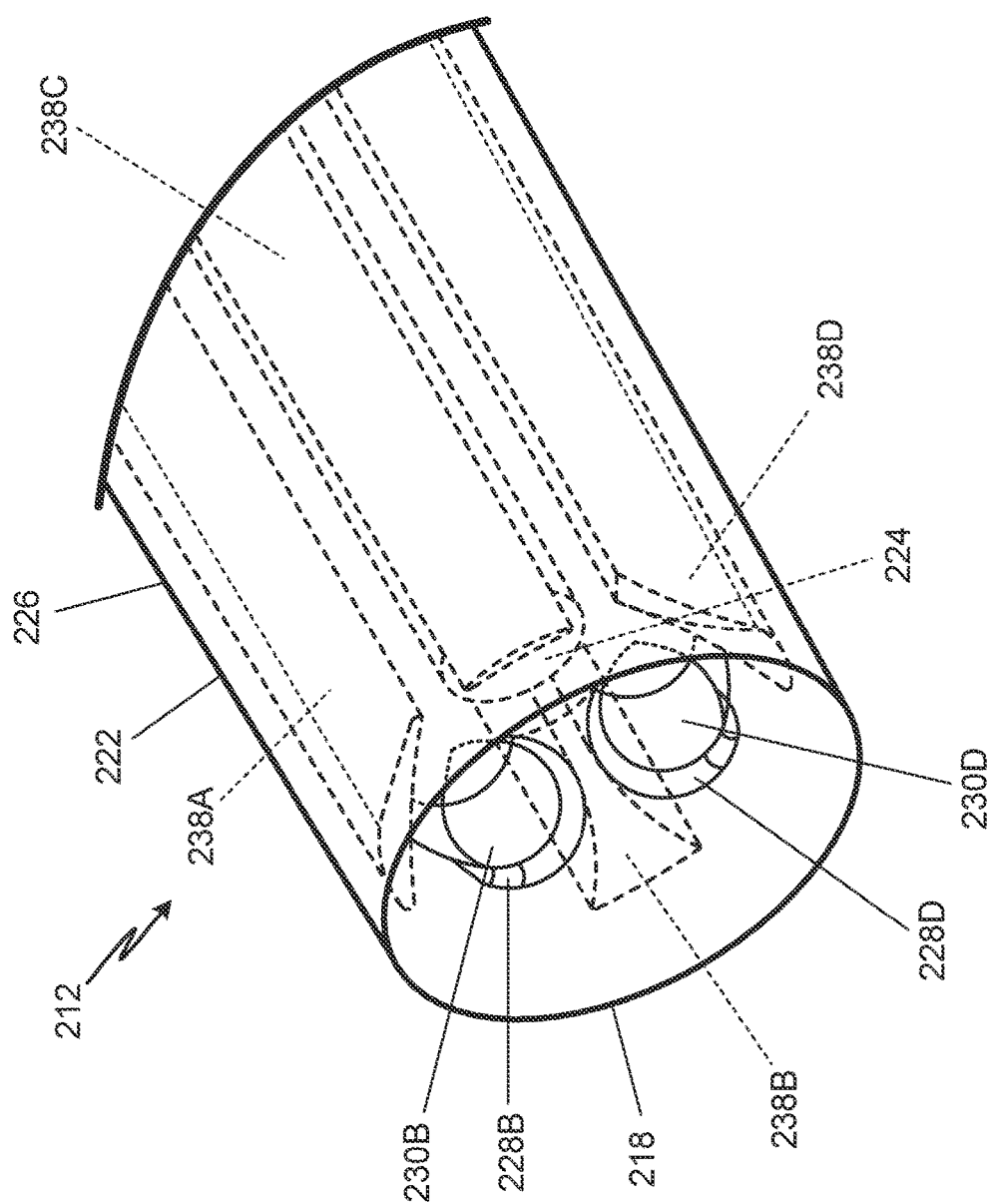
FIG. 4B is a partial perspective front view of the third embodiment of the probe head showing the enhanced conduction areas.
Figure 4C:
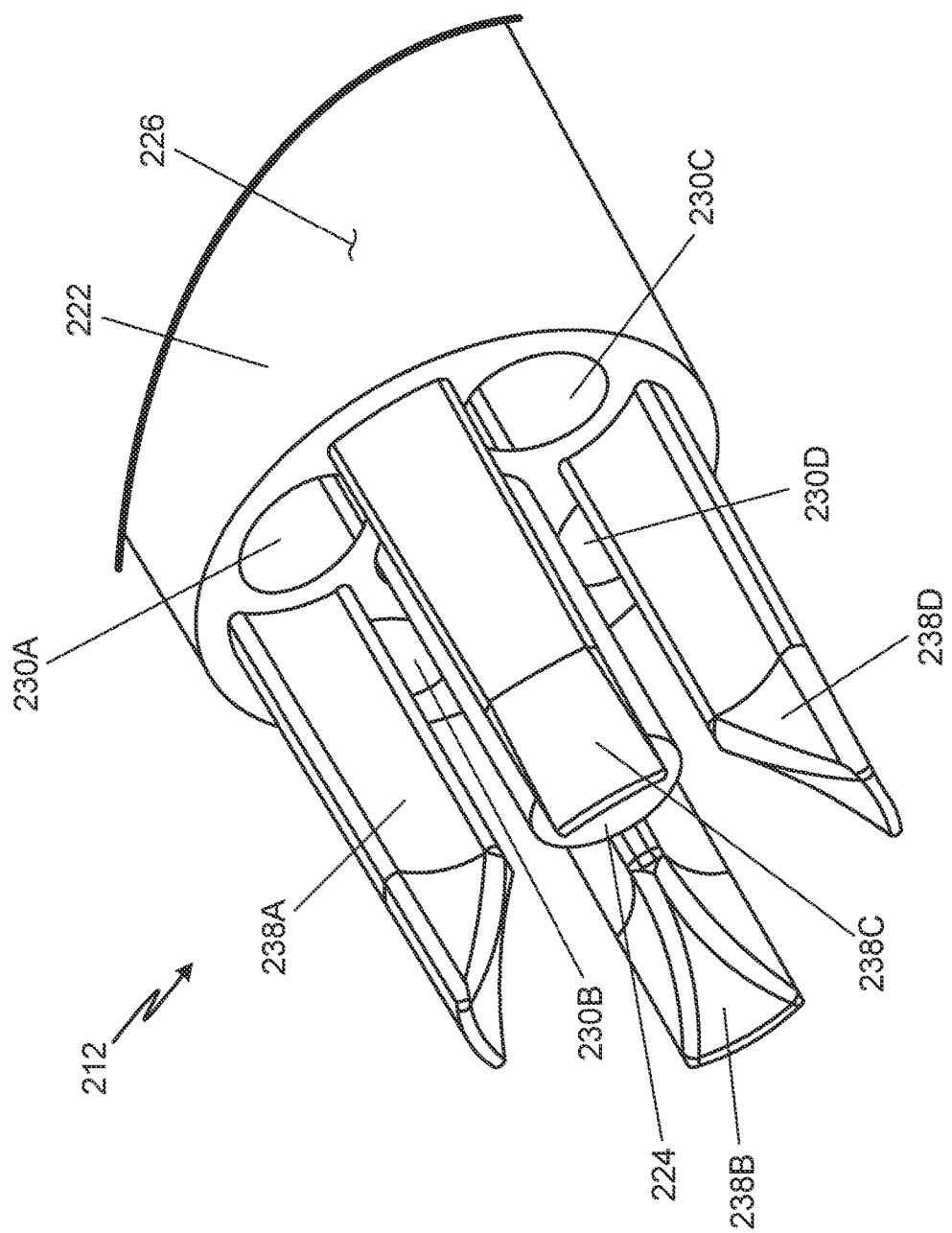
FIG. 4C is a partial perspective front view of the third embodiment of the probe head with part of the body of the probe head removed to show the enhanced conduction areas.
Figure 4E:
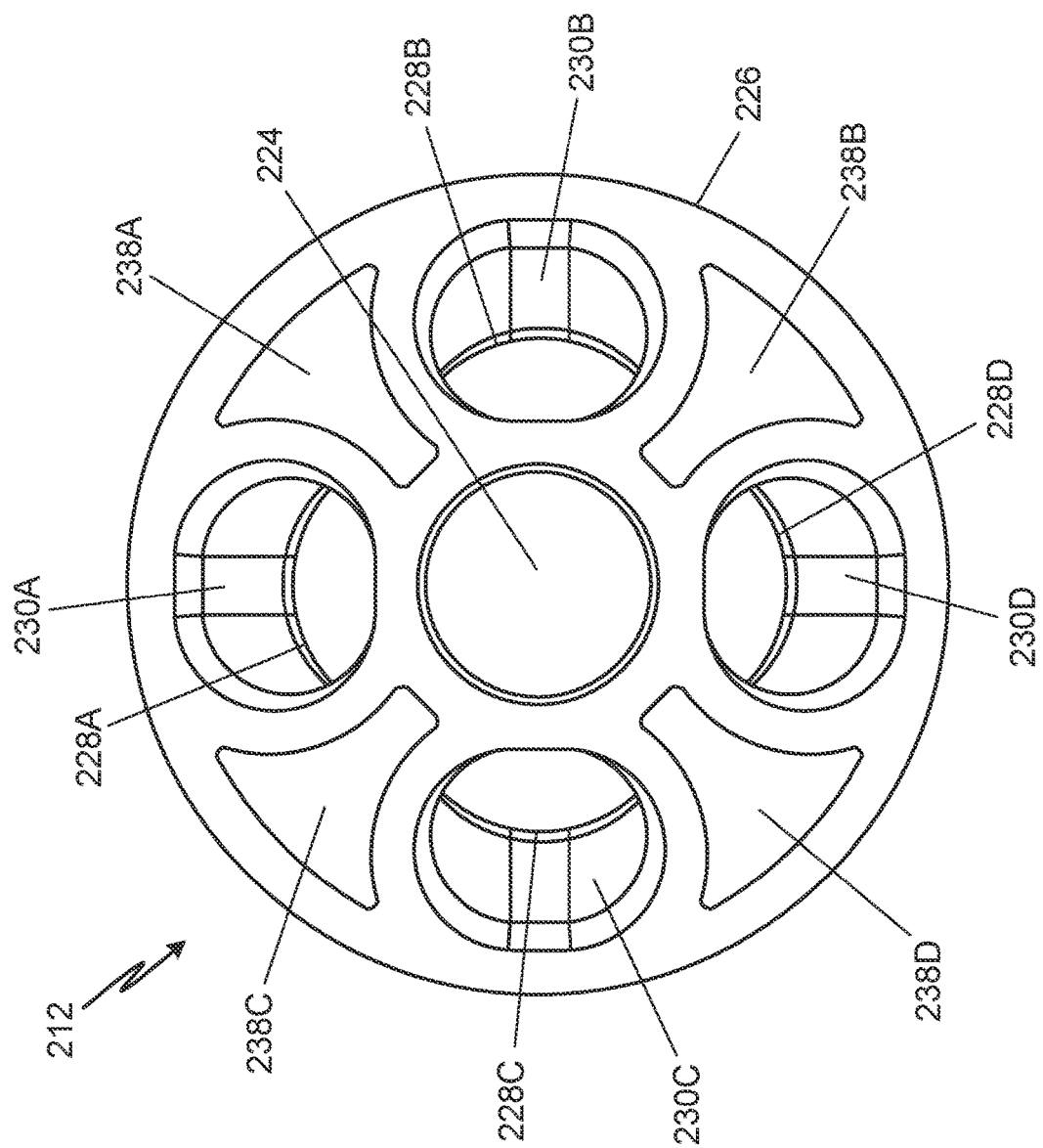
FIG. 4E is a cross-sectional view of the third embodiment of the probe head taken along line E-E of FIG. 4A.

FIG. 4A is a perspective top view of air data probe 210 showing enhanced conduction areas 238 of probe head 212. FIG. 4B is a partial perspective front view of probe head 212 showing enhanced conduction areas 238A, 238B, 238C, and 238D. FIG. 4C is a partial perspective front view of probe head 212 with part of body 222 of probe head 212 removed to show enhanced conduction areas 238A, 238B, 238C, and 238D. FIG. 4D is a cross-sectional view of probe head 212 taken along line D-D of FIG. 4A. FIG. 4E is a cross-sectional view of probe head 212 taken along line E-E of FIG. 4A. FIGS. 4A, 4B, 4C, 4D, and 4E will be discussed together. Air data probe 210 includes probe head 212, strut 214, and mounting flange 216. Probe head 212 includes first end 218, second end 220, body 222, and heater 224. Body 222 includes exterior surface 226, inlets 228A, 228B, 228C, and 228D, air passageways 230A, 230B, 230C, and 230D, water dams 232A and 232B, heater bore 234 (including interior surface 236), and enhanced conduction areas 238A, 238B, 238C, and 238D.

Probe head 212 has first end 218 making up the tip of probe head 212. Second end 220 is opposite first end 218. Second end 220 of probe head 212 is connected to strut 214. Body 222 of probe head 212 extends from first end 218 to second end 220. Body 222 may be a unitary, or single-piece, structure. Body 222 is additively manufactured and made of nickel or any other suitable material. Heater 224 is positioned within body 222. In this embodiment, a single heater 224 extends through a center, or down the middle, of body 222. Heater 224 is a rod heater, which includes both rod and rod-like structures. Heater 224 may be comprised of an electric resistive wire heater helically wound around a ceramic rod-like core. Heater 224 may be tailored such that heater 224 has different amounts of power along heater 224. For example, electric resistive wire may be wound to result in tighter or looser coils on ceramic core to increase or decrease the amount of coils, and thus the power density along heater 224. Heater 224 may have more tightly wound coils at an end of heater 224 adjacent first end 218 of probe head 212 to deliver a greater amount of heat to the tip. Alternatively, heater 224 may be uniform such that the power density of heater 224 is uniform along heater 224.

Exterior surface 226 of body 222 is an outer surface of body 222. Exterior surface 226 of body 222 is the outer surface of probe head 212. As such, external airflow contacts exterior surface 226. Body 222 has inlets 228A, 228B, 228C, and 228D near first end 218 of probe head 212. Inlets 228A, 228B, 228C, and 228D are openings in body 222. In this embodiment, body 222 has four inlets 228A, 228B, 228C, and 228D. In alternate embodiments, body 222 has any suitable number of inlets 228. Each inlet 228A, 228B, 2228C, 28D is connected to a respective air passageway 230A, 230B, 230C, and 230D. As such, body 222 has four air passageways 230A, 230B, 230C, and 230D. Air passageways 230A, 230B, 230C, and 230D extend from respective inlets 228A, 228B, 228C, and 228D to second end 220 of probe head 212. Air passageways 230A, 230B, 230C, and 230D surround heater 224 such that air passageways 230A, 230B, 230C, and 230D are between heater 224 and exterior surface 226 of body 222. Air passageways 230A, 230B, 230C, and 230D extend in substantially straight lines and twist up to 90 degrees around water dams 232A and 232B. As such, air passageways 230A, 230B, 230C, and 230D may have an undulating geometry from first end 218 to second end 220 such that air passageways 230A, 230B, 230C, and 230D are redirected around water dams 232A and 232B. Water dams 232A and 232B are positioned in lines of sight of inlets 228A, 228B, 228C, and 228D. Water dams 232A extend radially. In this embodiment, body 222 has two water dams 232A and 232B spaced axially from each other. In alternate embodiments, body 222 may have any number of water dams 232A and 232B.

Heater bore 234 is a cylindrical opening, or well, extending through a center of body 222. Heater bore 234 is positioned between first end 218 and second end 220. Heater bore 234 is shaped to accept rod heater 224. In this embodiment, body 222 has a single heater bore 234 for a single heater 234. In alternate embodiments, body 222 may have a plurality of heater bores 234 to accommodate a plurality of heaters 234. Heater bore 234 has annular interior surface 236 that contacts heater 224. Specifically, heater 224 is slid into heater bore 234 such that heater 224 is in contact with interior surface 236 of heater bore 234. Exterior surface 226, inlets 228A, 228B, 228C, and 228D, air passageways 230A, 230B, 230C, and 230D, water dams 232A and 232B, and heater bore 234 are all unitary to body 222, forming a single-piece structure.

Enhanced conduction areas 238A, 238B, 238C, and 238D are between heater bore 234 and exterior surface 226 of probe head 212. Enhanced conduction areas 238A, 238B, 238C, and 238D are areas of enhanced thermal conduction. Enhanced conduction areas 238A, 238B, 238C, and 238D fill spaces in body 222 between internal components including air passageways 230A, 230B, 230C, and 230D, water dams 232A and 232B, and heater bore 234. Enhanced conduction areas 238A, 238B, 238C, and 238D are as large as possible, filling areas between internal components of body 222 while maintaining a uniform minimum wall thickness (such as about 25 thousandths of an inch) of, or offset from, internal components and exterior surface 226. Enhanced conduction areas 238A, 238B, 238C, and 238D are comprised of material having a higher thermal conductivity than the material forming the rest of body 222. For example, enhanced conduction areas 238A, 238B, 238C, and 238D may be a silver-copper alloy, which has heat conductivity about 3.5 times that of nickel.

Enhanced conduction areas 238A, 238B, 238C, and 238D are created by forming one or more cavities, or pockets, in body 222 during additive manufacturing of body 222 and filling the cavities with material having a higher conductivity than the material forming the rest of body 222. For example, the cavities may be filled with a silver-copper alloy. The cavities may be filled via multi-material additive manufacturing, via a two-step process by melting in the higher conductivity material in a vacuum furnace process, or via any other suitable process. As such, enhanced conduction areas 238A, 238B, 238C, and 238D may also be unitary to body 222. The higher conductivity material may be in the form of a powder, a wire (such as a pelletized wire), or in any other suitable form prior to filling cavities within body 222.

Heater 224 connects to heater circuitry (not shown) at second end 220 of probe head 212, the circuitry going down strut 214 to connect to and get power from internal components of air data probe 210. Heater 224 can have different amounts of power along rod heater 224 to distribute more heat or less heat depending on the needs of probe head 212, or power can be uniform along heater 224 to further simplify manufacturing of heater 224.

Thermal resistance of body 222 varies, particularly from heater 224 to exterior surface 226, from first end 218 to second end 220 of probe head 212 due to different amounts of material between heater 224 and exterior surface 226 moving axially from first end 218 to second end 220 of probe head 212. For example, air passageways 230A, 230B, 230C, and 230D can increase or decrease in diameter to increase or decrease the amount of material between heater bore 234 and exterior surface 226, varying the thermal resistance of probe head 212 by having more or less metal to carry heat radially outward from heater 224. Less metal in probe head 212 moving from first end 218 to second end 220 reduces the thermal resistance and results in less heat conduction from heater 224 to exterior surface 226 of probe head 212 moving from first end 218 to second end 220. As such, probe head 212 is conducting less heat near second end 220 and diverting more heat toward first end 218, or tip, of probe head 212. Enhanced conduction areas 238A, 238B, 238C, and 238D maximize heat conduction by filling the space between internal components of body 222 while maintaining a uniform offset from, or wall thickness of, internal components and exterior surface 226 needed for the functionality of probe head 212. As such, enhanced conduction areas 238A, 238B, 238C, and 238D may also increase or decrease in size moving axially from first end 218 to second end 220 of probe head 212. For example, enhanced conduction areas 238A, 238B, 238C, and 238D may be larger near tip, or first end 218, of probe head 212, resulting in higher thermal conductivity and greater heat conduction to first end 218.

Air passageways 230A, 230B, 230C, and 230D are not fully linear and twist, or undulate, around heater bore 234 and water dams 232A and 232B to result in a line-of-sight deflection from first end 218. An absence of a straight path from inlets 228A, 228B, 228C, and 228D, at first end 218, to second end 220 of probe head 212, as shown in FIG. 4D, assists in managing water that could get into probe head 212. Water dams 232A and 232B redirect, or knock down, water particles in the airflow moving through air passageways 230A, 230B, 230C, and 230D. Water dams 232A and 232B block ice and water particles in exterior airflow and prevent ice and water particles from having a direct route down air passageways 230A, 230B, 230C, and 230D and through probe head 212.

Traditional air data probes have a wire heater brazed to a body of a probe head. Other components, such as water dams, may also be positioned within and brazed onto traditional probe heads. As such, probe heads of traditional air data probes have complex heaters incorporated into multi-piece assemblies. Additionally, probe head bodies are typically formed of a single material.

Additive manufacturing allows for more complex internal geometry, including air passageways 230A, 230B, 230C, and 230D, water dams 232A and 232B, heater bore 234, and enhanced conduction areas 238A, 238B, 238C, and 238D of probe head 212, which contribute to optimal functionality of air data probe 210. Because exterior surface 226, inlets 228A, 228B, 228C, and 228D, air passageways 230A, 230B, 230C, and 230D, water dams 232A and 232B, heater bore 234 of body 222 form a single unitary piece, air passageways 230A, 230B, 230C, and 230D, water dams 232A and 232B, and heater bore 234 are uniform in size, shape, and position among probe heads 212 to ensure optimal fit and performance as well as repeatability. For example, heater bore 234, water dams 232A and 232B, and air passageways 230A, 230B, 230C, and 230D are combined with rod heater 224 and body 222 ensures the best fit between heater 224 and body 222. Further, enhanced conduction areas 238A, 238B, 238C, and 238D formed via multi-material additive manufacturing are uniform among probe heads 212, also ensuring optimal performance and repeatability. Additively manufactured body 222 of probe head 212 allows for easier and more effective use of rod-shaped heater 224 and enhanced conduction areas 238A, 238B, 238C, and 238D.

Rod heater 224 is simpler than a traditional complex heater brazed into a probe head. Because the power density of rod heater 224 can change axially along heater 224, heater 224 still maintains the ability to tailor heat distribution within probe head 212 by enhancing conduction to the portions of probe head 212 that need heat via varied power density of heater 224. Rod heater 224 can be a standardized heater among probe heads 212. Heater 224 is also easier to manufacture and simplifies the assembly process of probe head 212. Enhanced conduction areas 238A, 238B, 238C, and 238D are also integrated into body 222 to further tailor heat distribution within probe head 212. Enhanced conduction areas 238A, 238B, 238C, and 238D allow for more heat conduction toward first end 218, or tip, of probe head 212 while maintaining a simple manufacture and assembly of probe head 212.

The geometry of air passageways 230A, 230B, 230C, and 230D allows air passageways 230A, 230B, 230C, and 230D to twist around water dams 232A and 232B positioned in their direct path from first end 218. Water dams 232A and 232B prevent ice and water particles from external airflow from moving through probe head 212 and decreasing functionality of air data probe 210.

Utilizing additive manufacturing to create more complex internal geometry of body 222, which has a complex one-piece shape that includes air passageways 230A, 230B, 230C, and 230D, water dams 232A and 232B, heater bore 234, and enhanced conduction areas 238A, 238B, 238C, and 238D and integrating a simpler form of a heater via rod heater 224 achieves the internal shapes and passages needed for optimal functionality of probe head 212 while enhancing heat conduction and simplifying manufacturing and assembly of probe head 212.

Figure 5B:
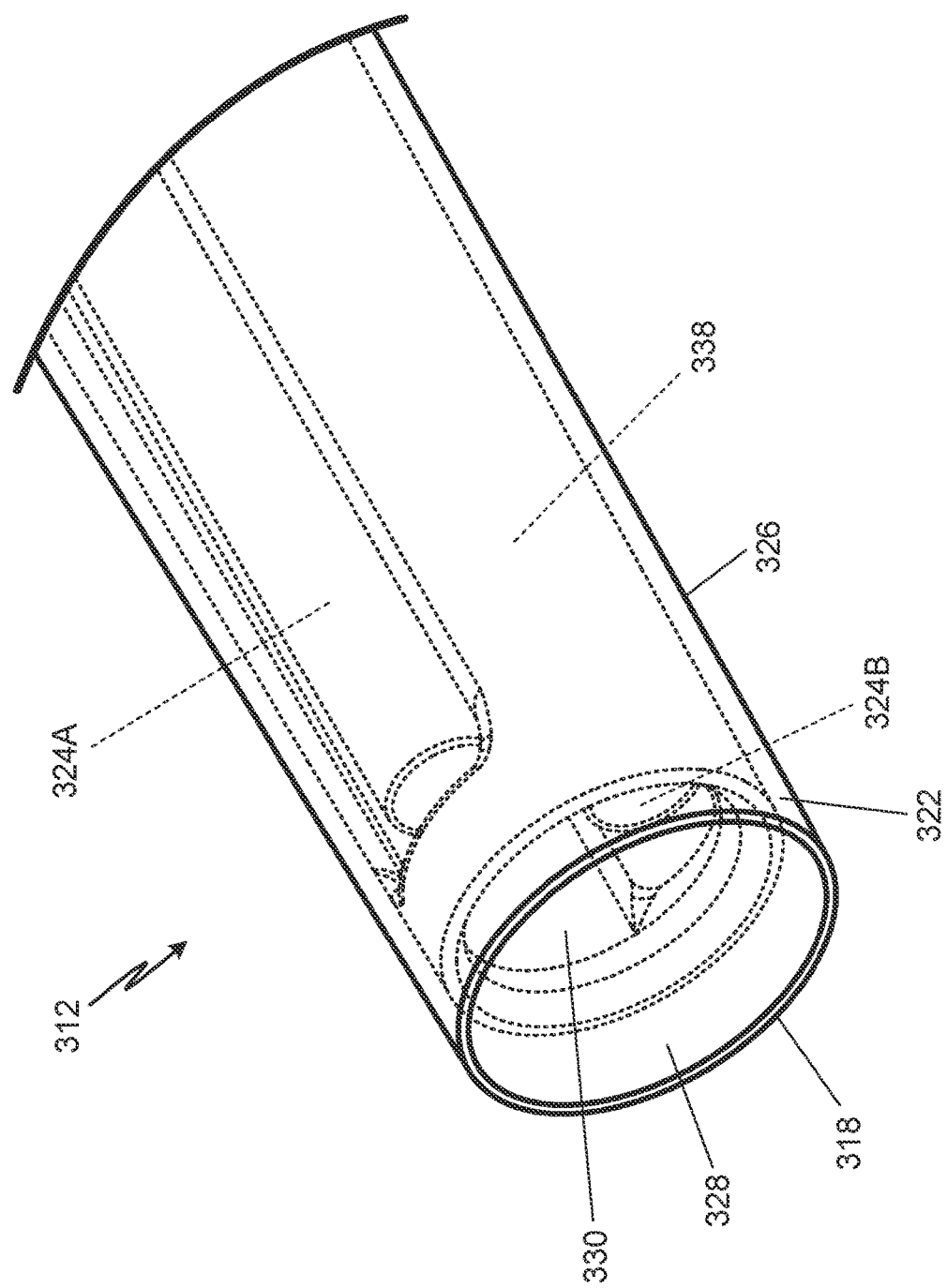
FIG. 5B is a partial perspective front view of the fourth embodiment of the probe head showing the enhanced conduction area.
Figure 5C:
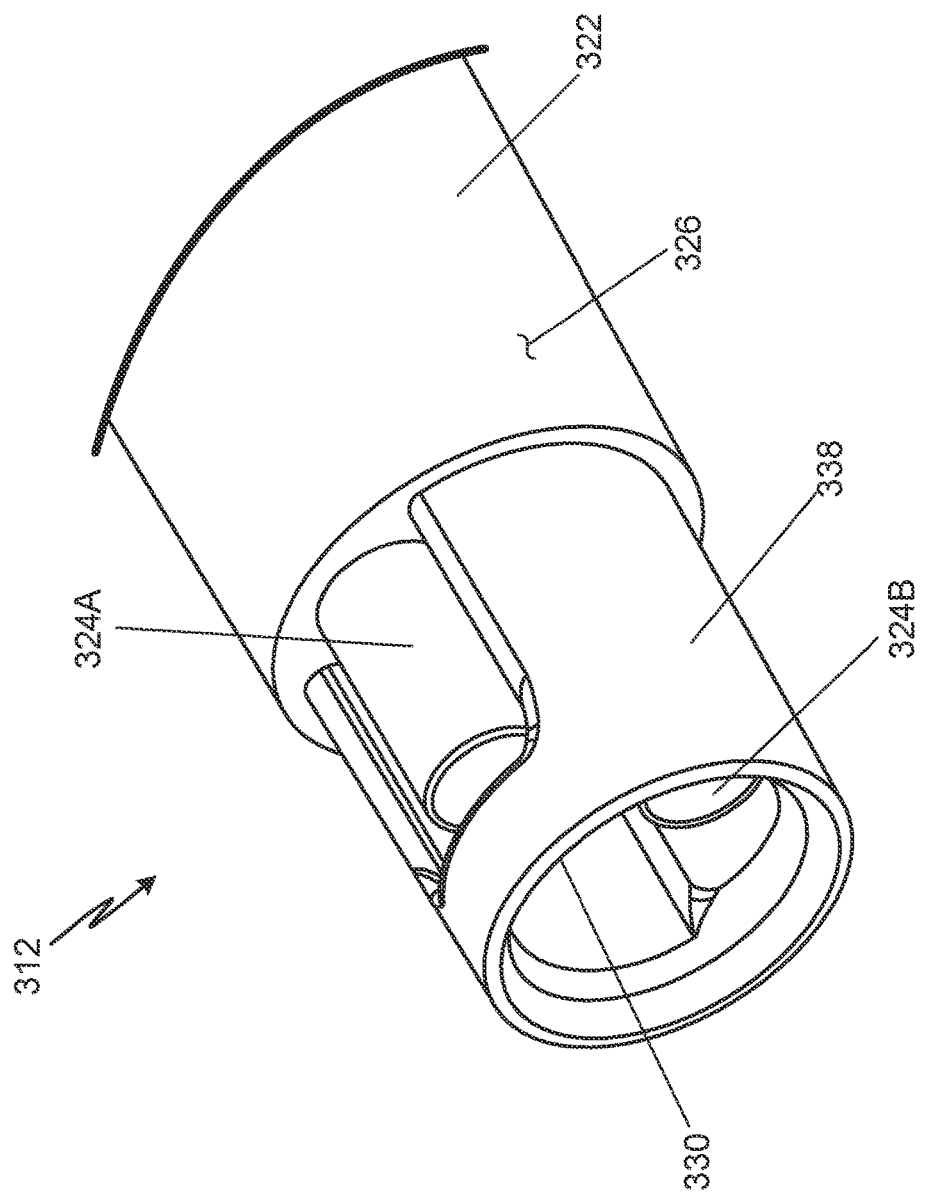
FIG. 5C is a partial perspective front view of the fourth embodiment of the probe head with part of the body of the probe head removed to show the enhanced conduction area.
Figure 5D:
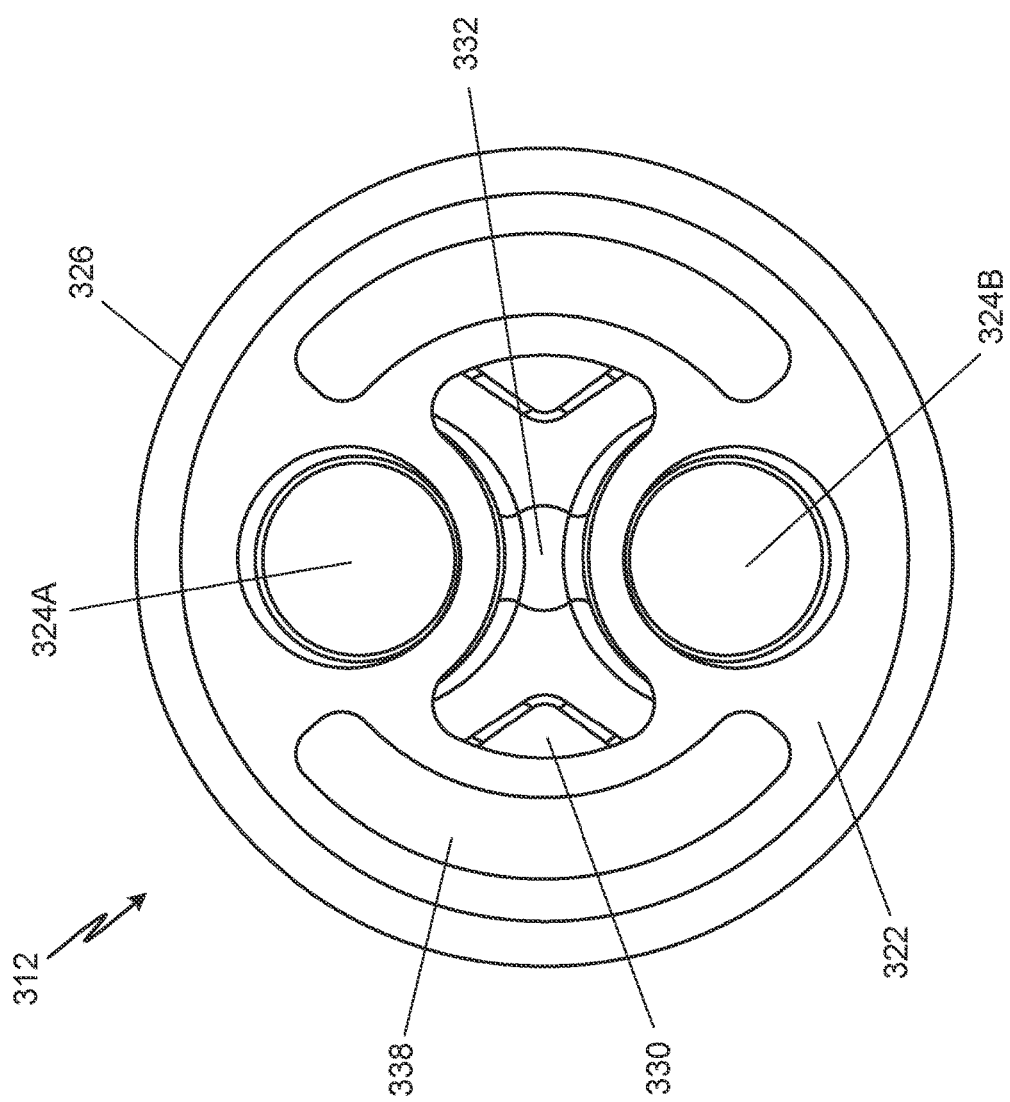
FIG. 5D is a cross-sectional view of the fourth embodiment of the probe head taken along line D-D of FIG. 5A.
Figure 5E:
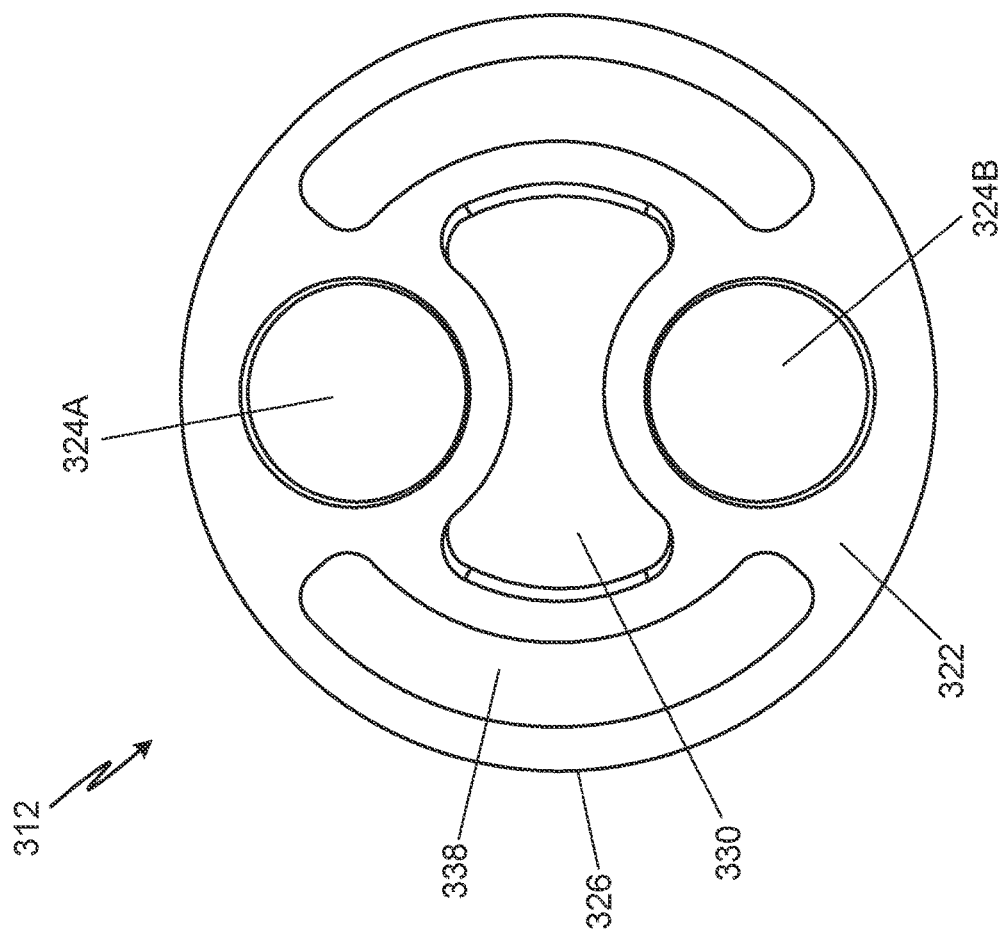
FIG. 5E is a cross-sectional view of the fourth embodiment of the probe head taken along line E-E of FIG. 5A.

FIG. 5A is a perspective top view of air data probe 310 showing enhanced conduction area 338 of probe head 312. FIG. 5B is a partial perspective front view of probe head 312 showing enhanced conduction area 338. FIG. 5C is a partial perspective front view of probe head 312 with part of body 322 of probe head 312 removed to show enhanced conduction area 338. FIG. 5D is a cross-sectional view of probe head 312 taken along line D-D of FIG. 5A. FIG. 5E is a cross-sectional view of probe head 312 taken along line E-E of FIG. 5A. FIGS. 5A, 5B, 5C, 5D, and 5E will be discussed together. Air data probe 310 includes probe head 312, strut 314, and mounting flange 316. Probe head 312 includes first end 318, second end 320, body 322, and heaters 324A and 324B. Body 326 includes exterior surface 326, inlet 328, air passageway 330, water dam 332, and heater bores 334A and 334B (including interior surface 336A and interior surface 336B, respectively) and enhanced conduction area 338.

Probe head 312 has first end 318 making up the tip of probe head 312. Second end 320 is opposite first end 318. Second end 320 of probe head 312 is connected to strut 314. Body 322 of probe head 312 extends from first end 318 to second end 320. Body 322 may be a unitary, or single-piece, structure. Body 322 is additively manufactured and made of nickel or any other suitable material. Heaters 324A and 324B are positioned within body 322. In this embodiment, probe head 312 has two side-by-side heaters 324A and 324B. Heaters 324A and 324B are spaced radially from each other. As such, heaters 324A and 324B are positioned adjacent exterior surface 326 of body 326. Heaters 324A and 324B are rod heaters, which includes both rod and rod-like structures. Each heater 324A, 324B may be comprised of an electric resistive wire heater helically wound around a ceramic rod-like core. Each heater 324A, 324B may be tailored such that heater 324A, 324B has different amounts of power along heater 324A, 324B. For example, electric resistive wire may be wound to result in tighter or looser coils on ceramic core to increase or decrease the amount of coils, and thus the power density along heater 324A, 324B. Heater 324A, 324B may have more tightly wound coils at an end of heater 324A, 324B adjacent first end 318 of probe head 312 to deliver a greater amount of heat to the tip. Alternatively, heater 324A, 324B may be uniform such that the power density of heater 324A, 324B is uniform along heater 324A, 324B.

Exterior surface 326 of body 322 is an outer surface of body 322. Exterior surface 326 of body 322 is the outer surface of probe head 312. As such, external airflow contacts exterior surface 326. Body 322 has inlet 328 near first end 318 of probe head 312. Inlet 328A is an opening in body 322. In this embodiment, body 322 has a single inlet 328A. Inlet 328 is connected to air passageway 330. As such, body 322 has a single air passageway 330. Air passageway 330 extends from inlets 328 to second end 320 of probe head 312. Air passageway 330 extends through a center, or down the middle, of body 322. A majority of air passageway 330 extends between heaters 324A and 324B such that heaters 324A and 324B are between a majority of air passageway 330 and exterior surface 326 of body 322. Air passageway 330 extends in a substantially straight line and twists up to 90 degrees around water dam 332. As such, air passageway 330 may have an undulating geometry from first end 318 to second end 320 such that air passageway 330 is redirected around water dam 332. Water dam 332 is positioned in the line of sight of inlet 328. Water dam 332 extends radially. In this embodiment, body 322 has a single water dam 332.

Each heater 324A, 324B is positioned within a heater bore 334A, 334B. Heater bores 334A and 334B are cylindrical openings, or wells, extending along body 322 adjacent exterior surface 326. Heater bores 334A and 334B are positioned between first end 318 and second end 320. Heater bores 334A and 334B are not aligned. Rather, heater bores 334A and 334B are offset from exterior surface 326 of probe head 312, which is slightly tapered. Each heater bore 334A, 334B is shaped to accept a respective rod heater 324A, 324B. In this embodiment, body 322 has two heater bores 334A and 334B to accommodate two heaters 334A and 334B. In alternate embodiments, probe head 312 may have one or more than two heaters 324A and 324B, each heater 324A, 324B positioned within a respective heater bore 334A, 334B. Each heater bore 334A, 334B has annular interior surface 336A, 336B that contacts respective heater 324A, 324B. Each heater 324A, 324B is slid into a respective heater bore 334A, 334B such that each heater 324A, 324B is in contact with an interior surface of heater bore 334A, 334B. Exterior surface 326, inlets 328, air passageway 330, water dam 332, and heater bores 334A and 334B are all unitary to body 322, forming a single-piece structure.

Enhanced conduction area 338 is between heater bores 334A and 334 and exterior surface 326 of probe head 312. Enhanced conduction area 338 is an area of enhanced thermal conduction. Enhanced conduction area 338 surrounds inlet 328, air passageway 330, and water dam 232. Enhanced conduction area 338 fills space in body 322 between internal components. Enhanced conduction area 338 is as large as possible in a portion of body 322 adjacent first end 318, filling areas between internal components of body 322 while maintaining a uniform minimum wall thickness (such as about 25 thousandths of an inch) of, or offset from, internal components and exterior surface 326. In this embodiment, enhanced conduction area 338 does not extend to second end 320. Enhanced conduction area 338 is comprised of material having a higher thermal conductivity than the material forming the rest of body 322. For example, enhanced conduction area 338 may be a silver-copper alloy, which has a heat conductivity about 3.5 times that of nickel.

Enhanced conduction area 338 is created by forming a cavity, or pocket, in body 322 during additive manufacturing of body 322 and filling the cavity with material having a higher conductivity than the material forming the rest of body 322. For example, the cavity may be filled with a silver-copper alloy. The cavities may be filled via multi-material additive manufacturing, via a two-step process by melting in the higher conductivity material in a vacuum furnace process, or via any other suitable process. As such, enhanced conduction area 338 may also be unitary to body 322. The higher conductivity material may be in the form of a powder, a wire (such as a pelletized wire), or in any other suitable form prior to filling cavities within body 322.

Heaters 324A and 324B connect to heater circuitry (not shown) at second end 320 of probe head 312, the circuitry going down strut 314 to connect to and get power from internal components of air data probe 310. Heaters 324A and 324B can have different amounts of power along rod heaters 324A and 324B to distribute more heat or less heat depending on the needs of probe head 312, or power can be uniform along heaters 324A and 324B to further simplify manufacturing of heaters 324A and 324B.

Thermal resistance of body 322 varies, particularly from each heater 324A, 324B to exterior surface 326, from first end 318 to second end 320 of probe head 312 due to different amounts of material between each heater 324A, 324B and exterior surface 326 moving axially from first end 318 to second end 320 of probe head 312. The thermal resistance of probe head 312 can be varied by having more or less metal to carry heat radially outward from heaters 324A and 324B. Less metal in probe head 312 moving from first end 318 to second end 320 reduces the thermal resistance and results in less heat conduction from heaters 324A and 324B to exterior surface 326 of probe head 312 moving from first end 318 to second end 320. As such, probe head 312 may conduct less heat near second end 320 and divert more heat toward first end 318, or tip, of probe head 312. Enhanced conduction area 238 maximizes heat conduction, particularly near first end 318, by filling the space between internal components of body 322 in a front portion of body 322 near first end 318 while maintaining a uniform offset from, or wall thickness of, internal components and exterior surface 326 needed for the functionality of probe head 312. As such, enhanced conduction area 338 may also increase or decrease in size moving axially away from first end 318 toward second end 320 of probe head 312. For example, enhanced conduction area 338 may be larger near tip, or first end 318, of probe head 312, resulting in higher thermal conductivity and greater heat conduction to first end 318. Enhanced conduction area 338 is also fully annular closer to, or adjacent, first end 318, resulting in greater heat conduction to tip, or first end 318.

Air passageway 330 is not fully linear and twists, or undulates, around heater bores 334A and 334B and water dam 332 to result in a line-of-sight deflection from first end 318. An absence of a straight path from inlet 328 at first end 318 to second end 320 of probe head 312, as shown in FIG. 5D, assists in managing water that could get into probe head 312. Water dam 332 redirects, or knocks down, water particles in the airflow moving through air passageway 330. Water dam 332 blocks ice and water particles in exterior airflow and prevents ice and water particles from having a direct route down air passageway 330 and through probe head 312.

Additive manufacturing allows for more complex internal geometry, including air passageway 330, water dam 332, heater bores 334A and 334B, and enhanced conduction area 338 of probe head 312, which contribute to optimal functionality of air data probe 310. For example, probe head 312 is able to have two heater bores 334A and 334B, positioned exactly where needed, and enhanced conduction area 238 as well as the required internal geometry of air passageway 330 and water dam 332 that probe head 312 requires in order to function properly due to additively manufacturing probe head 312. Because exterior surface 326, inlets 328, air passageway 330, water dam 332, heater bores 334A and 334B of body 322 form a single unitary piece, air passageway 330, water dam 332, and heater bores 334A and 334B are uniform in size, shape, and position among probe heads 312 to ensure optimal fit and performance as well as repeatability. For example, heater bores 334A and 334B, water dam 332, and air passageway 330 are combined with rod heaters 324A and 324B and body 322 ensures the best fit between heaters 324A and 324A and 324B and body 322. Further, enhanced conduction area 238 formed via multi-material additive manufacturing is uniform among probe heads 312, also ensuring optimal performance and repeatability. Additively manufactured body 322 of probe head 312 allows for easier and more effective use of rod-shaped heaters 324A and 324B and enhanced conduction area 338.

Additive manufacturing allows for two heaters 324A and 324B, positioned side-by-side, to increase the heating ability of probe head 312 compared to probe head 12 that has a single heater 24, as shown in FIGS. 2A-2F, when more heat is required. Probe head 312 can respond to increased heat demands. Heater bores 334A and 334B are additively manufactured exactly where heat is needed such that heaters 324A and 324B provide enough heat within probe head 312. Further, water dam 332, air passageway 330, and enhanced conduction area 338 are additively manufactured and shaped differently to accommodate multiple heater bores 334A and 334B. The geometry of air passageway 330 allows air passageway 330 to twist around water dams 332 positioned in its direct path from first end 318. Water dam 332 prevents ice and water particles from external airflow from moving through probe head 312 and decreasing functionality of air data probe 310. A forward end of enhanced conduction area 338 is forward of heaters 324A and 324B in order to provide increased heat distribution to first end 318, which is subject to most extreme icing conditions.

Rod heaters 324A and 324B are simpler than a traditional complex heater brazed into a probe head. Because the power density of rod heaters 324A and 324B can change axially along heaters 324A and 324B, heaters 324A and 324B still maintain the ability to tailor heat distribution within probe head 312 by enhancing conduction to the portions of probe head 312 that need heat via varied power density of heaters 324A and 324B. Rod heaters 324A and 324B can be standardized heaters among probe heads 312. Heaters 324A and 324B are also easier to manufacture and simplify the assembly process of probe head 312. Enhanced conduction area 238 is also integrated into body 322 to further tailor heat distribution within probe head 312. Enhanced conduction area 238 allows for more heat conduction toward first end 318, or tip, of probe head 312 while maintaining a simple manufacture and assembly of probe head 312.

Utilizing additive manufacturing to create more complex internal geometry of body 322, which has a complex one-piece shape that includes air passageway 330, water dams 332, heater bores 334A and 334B, and enhanced conduction area 338 and integrating a simpler form of heaters via rod heaters 324A and 324B achieves the internal shapes and passages needed for optimal functionality of probe head 312 while enhancing heat conduction and simplifying manufacturing and assembly of probe head 312.

DISCUSSION OF POSSIBLE EMBODIMENTS

The following are non-exclusive descriptions of possible embodiments of the present invention.

A probe head of an air data probe includes a body extending from a first end to a second end of the probe head, the body comprising: an inlet adjacent the first end of the probe head; an air passageway extending through the body from the inlet to a second end of the probe head; a water dam extending radially through the body such that the air passageway is redirected around the water dam; a heater bore extending within the body; and an enhanced conduction area between heater bore and an exterior surface of the probe head; wherein the inlet, the air passageway, the water dam, and the heater bore are all unitary to the body; and a rod heater positioned within the heater bore.

The probe head of the preceding paragraph can optionally include, additionally and/or alternatively, any one or more of the following features, configurations and/or additional components:

The enhanced conduction area is comprised of a material having a higher thermal conductivity than a material forming the inlet, the air passageway, the water dam, and the heater bore of the body.

The enhanced conduction area is formed by filling a cavity within the body with a material having a higher conductivity than a material forming the inlet, the air passageway, the water dam, and the heater bore of the body.

The material forming the inlet, the air passageway, the water dam, and the heater bore is nickel.

The material having a higher conductivity than the material forming the inlet, the air passageway, the water dam, and the heater bore of the body is a silver-copper alloy.

The cavity within the body is filled via multi-material additive manufacturing.

The cavity within the body is filled by melting the material having a higher conductivity into the cavity after the body is additively manufactured.

The body further comprises an exterior surface that is unitary to the inlet, the air passageway, the water dam, and the heater bore of the body.

The enhanced conduction area is as large as possible while maintaining a uniform offset from the air passageway, the water dam, the heater bore, and an exterior surface of the body.

The uniform offset is about 25 thousandths of an inch.

The enhanced conduction area is unitary to the body.

The enhanced conduction area does not extend to the second end of the probe head.

The enhanced conduction area is fully annular adjacent the first end of the probe head.

The body comprises a plurality of enhanced conduction areas.

The enhanced conduction area is larger near the first end of the probe head.

The body includes a plurality of water dams.

The body includes a plurality of air passageways.

A plurality of rod heaters and wherein the body includes a plurality of heater bores, each rod heater being positioned in a heater bore.

The air passageway undulates around the water dam.

The single rod heater extends through a center of the body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe head of an air data probe, the probe head comprising:
    a body extending from a first end to a second end of the probe head, the body comprising:
        an inlet adjacent the first end of the probe head;
        an air passageway extending through the body from the inlet to a second end of the probe head;
        a water dam extending radially through the body such that the air passageway is redirected around the water dam;
        a heater bore extending within the body; and
        an enhanced conduction area between heater bore and an exterior surface of the probe head;
        wherein the inlet, the air passageway, the water dam, and the heater bore are all unitary to the body; and
    a rod heater positioned within the heater bore.

2. The probe head of claim 1, wherein the enhanced conduction area is comprised of a material having a higher thermal conductivity than a material forming the inlet, the air passageway, the water dam, and the heater bore of the body.

3. The probe head of claim 1, wherein the enhanced conduction area is formed by filling a cavity within the body with a material having a higher conductivity than a material forming the inlet, the air passageway, the water dam, and the heater bore of the body.

4. The probe head of claim 3, wherein the material forming the inlet, the air passageway, the water dam, and the heater bore is nickel.

5. The probe head of claim 3, wherein the material having a higher conductivity than the material forming the inlet, the air passageway, the water dam, and the heater bore of the body is a silver-copper alloy.

6. The probe head of claim 3, wherein the cavity within the body is filled via multi-material additive manufacturing.

7. The probe head of claim 3, wherein the cavity within the body is filled by melting the material having a higher conductivity into the cavity after the body is additively manufactured.

8. The probe head of claim 1, wherein the body further comprises an exterior surface that is unitary to the inlet, the air passageway, the water dam, and the heater bore of the body.

9. The probe head of claim 1, wherein the enhanced conduction area is as large as possible while maintaining a uniform offset from the air passageway, the water dam, the heater bore, and an exterior surface of the body.

10. The probe head of claim 9, wherein the uniform offset is about 25 thousandths of an inch.

11. The probe head of claim 1, wherein the enhanced conduction area is unitary to the body.

12. The probe head of claim 1, wherein the enhanced conduction area does not extend to the second end of the probe head.

13. The probe head of claim 1, wherein the enhanced conduction area is fully annular adjacent the first end of the probe head.

14. The probe head of claim 1, wherein the body comprises a plurality of enhanced conduction areas.

15. The probe head of claim 1, wherein the enhanced conduction area is larger near the first end of the probe head.

16. The probe head of claim 1, wherein the body includes a plurality of water dams.

17. The probe head of claim 16, wherein the body includes a plurality of air passageways.

18. The probe head of claim 1, further including a plurality of rod heaters and wherein the body includes a plurality of heater bores, each rod heater being positioned in a heater bore.

19. The probe head of claim 1, wherein the air passageway undulates around the water dam.

20. The probe head of claim 1, wherein the single rod heater extends through a center of the body.

* * * * *